(12) United States Patent
Edakunni et al.

(10) Patent No.: US 10,957,001 B2
(45) Date of Patent: Mar. 23, 2021

(54) METHOD AND SYSTEM FOR REAL TIME MANAGEMENT OF TRANSPORTATION SERVICES

(71) Applicant: Conduent Business Services, LLC, Dallas, TX (US)

(72) Inventors: Narayanan Unny Edakunni, Bangalore (IN); Bhupendra Singh Solanki, Indore (IN); Theja Tulabandhula, Bangalore (IN); Tuhin Bhattacharya, Panihati (IN)

(73) Assignee: Conduent Business Services, LLC, Florham Park, NJ (US)

( * ) Notice: Subject to any disclaimer, the term of this patent is extended or adjusted under 35 U.S.C. 154(b) by 660 days.

(21) Appl. No.: 15/378,338

(22) Filed: Dec. 14, 2016

(65) Prior Publication Data
US 2018/0165783 A1    Jun. 14, 2018

(51) Int. Cl.
| | |
|---|---|
| *G06Q 50/30* | (2012.01) |
| *H04L 29/08* | (2006.01) |
| *G06Q 30/02* | (2012.01) |
| *G06Q 10/06* | (2012.01) |
| *B60N 2/00* | (2006.01) |
| *H04W 4/029* | (2018.01) |
| *H04W 4/024* | (2018.01) |

(52) U.S. Cl.
CPC ............ *G06Q 50/30* (2013.01); *B60N 2/002* (2013.01); *G06Q 10/06393* (2013.01); *G06Q 30/0202* (2013.01); *H04L 67/12* (2013.01); *H04W 4/024* (2018.02); *H04W 4/029* (2018.02)

(58) Field of Classification Search
None
See application file for complete search history.

(56) References Cited

U.S. PATENT DOCUMENTS

| | | | |
|---|---|---|---|
| 2013/0226668 A1 | 8/2013 | Zou et al. | |
| 2015/0286936 A1* | 10/2015 | Furuya | B61L 27/0027 706/58 |
| 2015/0294264 A1* | 10/2015 | Gorin | G06Q 10/087 705/5 |

(Continued)

OTHER PUBLICATIONS

Heba Abdel Aziz, Mohamed Saleh, Mohamed H. Rasmy, and Hisham ElShishiny. Dynamic room pricing model for hotel revenue management systems. Egyptian Informatics Journal, 2011.

*Primary Examiner* — Alan Torrico-Lopez
(74) *Attorney, Agent, or Firm* — Jones Robb, PLLC

(57) ABSTRACT

The disclosed embodiments illustrate a method for real time management of transportation services. The method includes determining a discrete control process with respect to a plurality of states of a vehicle. Each state in the plurality of states corresponds to a station and a count of vacant seats in the vehicle at the station. A set of rules is generated to maximize a key performance parameter of the vehicle, based on at least the determined discrete control process. A valuation parameter is determined, in real time, for one or more vacant seats in the vehicle at each of one or more subsequent stations based on the generated set of rules. The determined valuation parameter for the one or more vacant seats corresponding to each of the one or more subsequent stations is transmitted to a plurality of mobile computing devices associated with a plurality of commuters.

16 Claims, 7 Drawing Sheets

(56) References Cited

U.S. PATENT DOCUMENTS

2016/0104383 A1* 4/2016 Chandran ............ G08G 5/0043
                                                        701/120
2017/0200355 A1* 7/2017 Gruenbaum ........... B61D 41/00

* cited by examiner

METHOD AND SYSTEM FOR REAL TIME MANAGEMENT OF TRANSPORTATION SERVICES

TECHNICAL FIELD

The presently disclosed embodiments are related, in general, to transportation services. More particularly, the presently disclosed embodiments are related to methods and systems for real time management of transportation services.

BACKGROUND

Generally, in public transit systems, price paid for availing a transportation service in terms of tickets is either fixed or priced per travel leg or the distance traveled. This type of pricing scheme is beneficial when the demand is balanced. However, there may be a scenario whereby there is a surge in demand, for example, during peak times, and the supply of vehicles (such as buses, shared cabs, and/or the like) for transportation services is not able to match the demand. One factor that may contribute to such an imbalanced demand is that the passengers adopt a strategy to minimize their travel time by boarding the first vehicle that arrives, even if the vehicle is overcrowded. Therefore, there is an uneven load across the vehicles running along a route, which in turn decreases the operational efficiency of the transit network.

In such scenarios, the public transit systems may adopt various pricing schemes, such as surge pricing or discount offers, for the vehicles to match the demand to the supply. In such pricing schemes, the price for availing the transportation service is varied dynamically for every passenger at same route. For example, two seats in a vehicle may be charged differently to two persons traveling from the same source to the same destination. Nevertheless, the supply is matched to the demand by use of such pricing schemes but the revenue generated by the public transit systems is adversely affected. Thus, an automatic and robust technique is required that not only matches the supply to the demand but also generates optimal revenue for the public transit systems.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method for data processing, by a computing device, to manage transportation services in real time. The method includes determining, by one or more processors in the computing device, a discrete control process with respect to a plurality of states of a vehicle received from a plurality of sensors. Each state in the plurality of states corresponds to a station and a count of vacant seats in the vehicle at the station. Further, the vehicle is in transit along a route comprising a plurality of stations that includes the station. The method further includes generating, by the one or more processors, a set of rules to maximize a key performance parameter of the vehicle, based on the determined discrete control process and demand distribution information received from a data acquisition device over a communication network. The method further includes determining, by the one or more processors, a valuation parameter from a plurality of valuation parameters, in real time, for one or more vacant seats in the vehicle at each of one or more subsequent stations in the plurality of stations based on the generated set of rules. The method further includes transmitting, by one or more transceivers, the determined valuation parameter for the one or more vacant seats corresponding to each of the one or more subsequent stations to a plurality of mobile computing devices, over the communication network, associated with a plurality of commuters waiting for the vehicle at the corresponding one or more subsequent stations.

According to embodiments illustrated herein, there is provided a system for data processing, by a computing device, to manage transportation services in real time. The system includes one or more processors in the computing device configured to determine a discrete control process with respect to a plurality of states of a vehicle received from a plurality of sensors. Each state in the plurality of states corresponds to a station and a count of vacant seats in the vehicle at the station. Further, the vehicle is in transit along a route comprising a plurality of stations that includes the station. The one or more processors are further configured to generate a set of rules to maximize a key performance parameter of the vehicle, based on the determined discrete control process and demand distribution information received from a data acquisition device over a communication network. The one or more processors are further configured to determine a valuation parameter from a plurality of valuation parameters, in real time, for one or more vacant seats in the vehicle at each of one or more subsequent stations in the plurality of stations based on the generated set of rules. Further, the one or more processors are configured to transmit the determined valuation parameter for the one or more vacant seats corresponding to each of the one or more subsequent stations to a plurality of mobile computing devices, over the communication network, associated with a plurality of commuters waiting for the vehicle at the corresponding one or more subsequent stations.

According to embodiments illustrated herein, there is provided a computer program product for use with a computing device. The computer program product comprises a non-transitory computer readable medium storing a computer program code for data processing to manage transportation services in real time. The computer program code is executable by one or more processors in a computing device to determine a discrete control process with respect to a plurality of states of a vehicle received from a plurality of sensors. Each state in the plurality of states corresponds to a station and a count of vacant seats in the vehicle at the station. Further, the vehicle is in transit along a route comprising a plurality of stations that includes the station. The computer program code is further executable by the one or more processors to generate a set of rules to maximize a key performance parameter of the vehicle, based on the determined discrete control process and demand distribution information received from a data acquisition device over a communication network. The computer program code is further executable by the one or more processors determine a valuation parameter from a plurality of valuation parameters, in real time, for one or more vacant seats in the vehicle at each of one or more subsequent stations in the plurality of stations based on the generated set of rules. The computer program code is further executable by the one or more processors transmit the determined valuation parameter for the one or more vacant seats corresponding to each of the one or more subsequent stations to a plurality of mobile computing devices, over the communication network, associated with a plurality of commuters waiting for the vehicle at the corresponding one or more subsequent stations.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
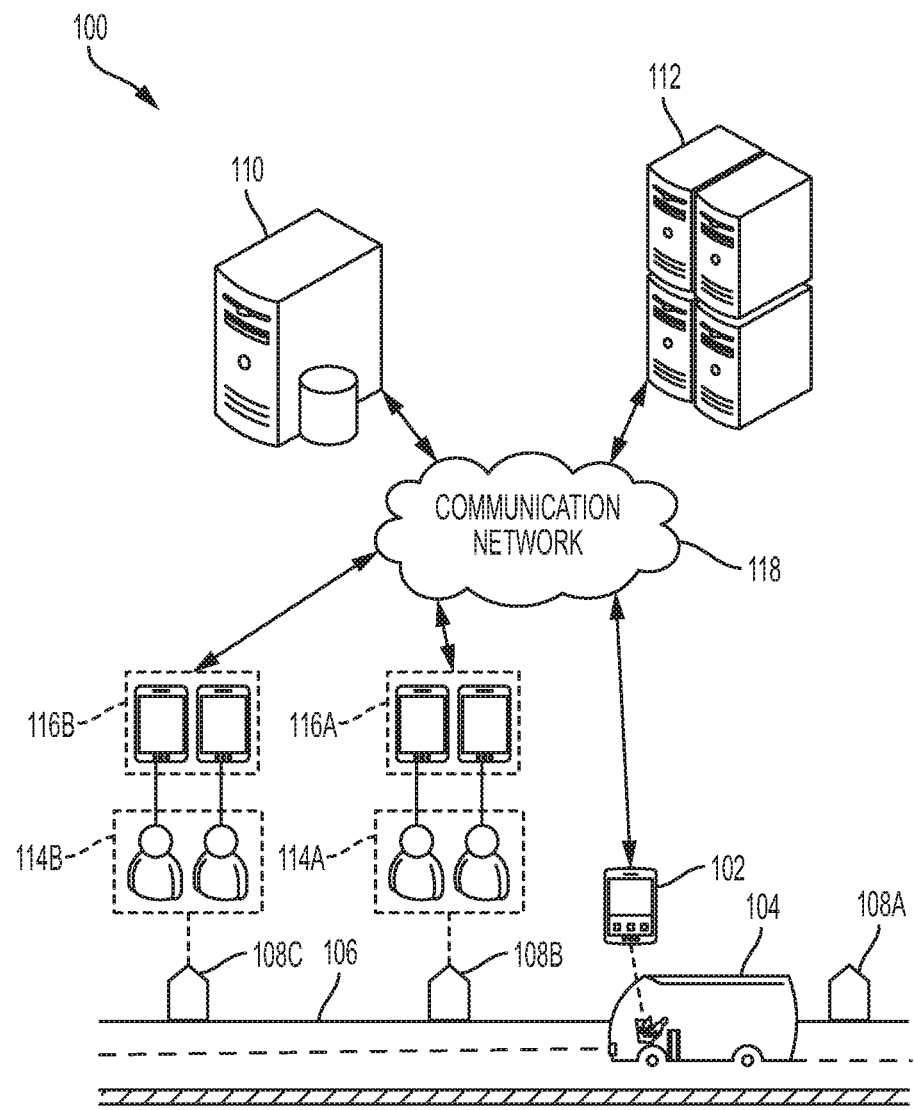
FIG. 1 is a block diagram that illustrates a system environment, in which various embodiments can be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions

The following terms shall have, for the purposes of this application, the meanings set forth below.

A "mobile computing device" refers to a computer, a device (that includes one or more processors/microcontrollers and/or any other electronic components), or a system (that performs one or more operations according to one or more programming instructions/codes) associated with a user, such as a commuter. In an embodiment, the mobile computing device may present a graphical user interface to the user for facilitating real time transportation service management. Examples of the mobile computing device may include, but are not limited to, a laptop, a personal digital assistant (PDA), a mobile device, a smartphone, and a tablet computer (e.g., iPad® and Samsung Galaxy Tab®).

"Transportation services" correspond to transport facilities that may offer one or more means of transport to a user to travel along one or more routes. In an embodiment, the transportation service may correspond to a public transportation service, a private transportation service, a shared transportation service, and/or the like. Examples of various transportation services may include, but are not limited to, a bus transportation service, a train transportation service, or an airplane transportation services.

A "vehicle" refers to a mode of transport that may transport one or more commuters and/or cargos between two or more stations along a route of transit. In an embodiment, one or more commuters may share the vehicle during the transit along the route. In an embodiment, the vehicle may be installed with a vehicle-computing device. In an embodiment, the vehicle may correspond to a bus, a truck, a car, a ship, an airplane, and/or the like.

A "commuter" refers to an individual who may wish to avail a transportation service to commute from a source station to a destination station among a plurality of stations along a route. For example, an individual wants to travel from "Harlem" to "East village." The individual may avail a transportation service, such as a bus service, for the travel. The individual may board a city bus, which is in transit from "Harlem" to "East village," from "Harlem." The individual may further alight the city bus at "East village." The individual may have to a certain fare to availing the transportation service. In this scenario, the individual may correspond to a commuter.

A "vehicle capacity" refers to a maximum count of commuters a vehicle can accommodate. For example, a city bus can accommodate a maximum of 15 commuters at any given time instant. In this scenario, the vehicle capacity of the city bus is "15."

"Load of commuters" for a vehicle refers to a count of commuters traveling in the vehicle at any given time instant. For example, at a time instant "T," "11" commuters may be traveling in a city bus. Thus, at the time instant "T" the load of the city bus is "11." The count of commuters traveling in the vehicle may change when the vehicle halts at each of a plurality of stations to pick new commuters and drop the commuters already in the vehicle. Thus, the load of commuters in the vehicle may vary at each of the plurality of stations.

"One or more vacant seats" refer to unoccupied seats in a vehicle. In an embodiment, a count of the one or more vacant seats may be determined based on a capacity of the vehicle and a count of commuters in the vehicle. For example, "11" commuters may be traveling in a city bus of vehicle capacity of "15." In this scenario, the count of the one or more vacant seats is "4."

A "route" refers to a path that may be traversed by a vehicle, while in transit. In an embodiment, the route may include a plurality of stations that may come in a predetermined order in the route. For example, a city bus travels from "Harlem" to "East Village" in "New York." Thus, the path from "Harlem" to "East Village" may correspond to the route with "Harlem" and "East Village" being the plurality of stations. The stations which are yet to be traversed by the vehicle, during the transit along the route, may be referred to as one or more subsequent stations. For example, a city bus that travels from "Harlem" to "East Village" in "New York." The city bus may be at halt at "Harlem" to pick up one or more commuters. In this scenario, "East Village" may correspond to a subsequent station for the city bus.

A "plurality of commuters" refers to individuals who may avail a transportation service to travel from one station to another station. The plurality of commuters may be waiting at a station for a vehicle. For example, "8" commuters may be waiting at "Harlem" for a city bus. In this scenario, "8" commuters may correspond to the plurality of commuters. Further, one or more commuters of the plurality of commuters may board the first vehicle that comes next to their arrival and the remaining commuters may wait for a vehicle that comes next to the first vehicle. For example, out of "8" commuters waiting at "Harlem," "5" commuters may board the city bus that arrives at "Harlem" at "12:15:00 p.m." and "3" commuters may wait for another city bus that arrives at "Harlem" at "12:30:00 p.m."

A "discrete control process" refers to a statistical framework for controlling decisions associated with a target. For example, for a target of maximizing a key performance indicator associated with a vehicle, the discrete control process may be determined to generate a set of rules to control the decisions. The decisions may correspond to a selection of a valuation parameter for the vehicle. At any time instant, the discrete control process may represent a state of the vehicle. The discrete control process may transition the vehicle from a current state to a new state, when an input is provided.

A "set of rules" refers to an optimum policy for maximizing a key performance indicator of a vehicle. The set of rules may be generated by use of a discrete control process to control one or more decisions associated with the vehicle. The one or more decisions may include a choice of a valuation parameter corresponding to each station along a route of transit of the vehicle.

A "state" of a vehicle corresponds to a station and a count of vacant seats in the vehicle at the station. Thus, for a plurality of stations the vehicle may have a plurality of states. A count of states of the vehicle may be a product of a vehicle capacity of the vehicle and a count of stations along a route of transit of the vehicle. For instance, a vehicle with a vehicle capacity of "three" may be in transit along a route with "two" stations. In such a case, the vehicle may have "ten" states. For example, if a vehicle with "four" seats is in transit along a route that has "two" stations, such as "S1" and "S2," the plurality of states of the vehicle may be {(1, S1), (2, S1), (3, S1), (4, S1), (1, S2), (2, S2), (3, S2), (4, S2)}. The vehicle may transition from a first state to a second state when an input is provided to a discrete control process.

A "key performance parameter" refers to a target, associated with a vehicle, which is to be optimized. Examples of the key performance indicator may include, but are not limited to, a revenue generated by the vehicle or a load of commuters carried by the vehicle. For an instance, the optimization of the key performance parameter may refer to a maximization of the revenue generated. In another instance, the optimization of the key performance parameter may refer to a control of the load of commuters carried by the vehicle within defined limits. For example, the load of commuters may be controlled to be within a lower load threshold and an upper load threshold.

"Demand distribution information" comprises information pertaining to a demand for a vehicle at each station of a plurality of stations as a function of a valuation parameter associated with the corresponding station. For example, demand distribution information corresponding to an $i^{th}$ station may be represented as $D_i = \{d_1, d_2, \ldots, d_N\}$. Further, $d_i \in \{d_1, d_2, \ldots, d_N\}$ may represent a demand (i.e., a count of commuters) associated with a valuation parameter $c_i \in \{c_1, c_2, \ldots, c_N\}$. In an embodiment, the demand distribution information may be determined based on historical demand data of the vehicle.

A "valuation parameter" refers to a fare of a ticket that a service provider may want to charge a commuter to avail a transportation service. For example, a service provider may charge "USD 1" to a commuter traveling from a first station to a second station on a vehicle. In such a case, "USD 1" may correspond to a valuation parameter. In an embodiment, the valuation parameter of the vehicle at a station may be varied dynamically based on demand distribution information and a key performance parameter to be achieved.

FIG. 1 is a block diagram of a system environment in which various embodiments may be implemented. With reference to FIG. 1, there is shown a system environment 100 that includes a vehicle-computing device 102 associated with a vehicle 104, a route 106 that has a plurality of stations, such as a first station 108A, a second station 108B, and a third station 108C. The vehicle 104 may be traveling along the route 106. The system environment 100 further includes a database server 110, and an application server 112. The system environment 100 further includes a plurality of mobile computing devices, such as a first plurality of mobile computing devices 114A and a second plurality of mobile computing devices 114B, associated with a plurality of commuters, such a first plurality of commuters 116A and a second plurality of commuters 116B, respectively. The system environment 100 further includes a communication network 118. Various devices in the system environment 100 may be interconnected over the communication network 118. FIG. 1 shows, for simplicity, one vehicle-computing device, such as the vehicle-computing device 102, one vehicle, such as the vehicle 104, one route, such as the route 106, three stations, such as the first station 108A, second station 108B, and third station 108C. FIG. 1 further shows, for simplicity, one database server, such as the database server 110, one application server, such as the application server 112, two pluralities of mobile computing devices, such as the first plurality of mobile computing devices 114A and the second plurality of mobile computing devices 114B, two pluralities of commuters, such as the first plurality of commuters 116A and the second plurality of commuters 116B. However, it will be apparent to a person having ordinary skill in the art that the disclosed embodiments may also be implemented using multiple vehicle-computing devices, multiple vehicles, multiple routes, multiple stations, multiple database servers, multiple application servers, multiple mobile computing devices, and multiple commuters without departing from the scope of the disclosure.

The vehicle-computing device 102 refers to a computing device that includes one or more processors and one or more memory devices. The one or more memory devices may include computer readable codes and instructions that may be executable by the one or more processors to perform predetermined operations. The vehicle-computing device 102 may be installed in the vehicle 104. The one or more memory devices of the vehicle-computing device 102 may store information pertaining to geographical map data. In an embodiment, the vehicle-computing device 102 may include a navigation device with inbuilt GPS sensors. The vehicle-computing device 102 may be configured to transmit information pertaining to a real time location of the vehicle 104 to the application server 112. The vehicle-computing device 102 may further present a route information of a route of transit, such as the route 106, of the vehicle 104 to an operator of the vehicle 104. Examples of the operator may include, but are not limited to, an individual driving a vehicle, an individual navigating the vehicle, or an individual coordinating a route of the vehicle. The vehicle-computing device 102 may further transmit information pertaining to a count of vacant seats in the vehicle 104 to the application server 112.

The vehicle-computing device 102 may correspond to a variety of computing devices, such as a laptop, a PDA, a tablet computer, a Smartphone, a Phablet, and the like.

The vehicle 104 may refer to a mode of transport utilized by commuters to commute from a source location to a destination location. The vehicle 104 may correspond to a variety of public or private mode of transport, such as, but not limited to, a bus, a train, an airplane, and a shared cab. The vehicle 104 may be driven by the operator (not shown) of the vehicle 104 along a route, such as the route 106. While in transit along the route 106, the vehicle 104 may pass through the plurality of stations, such as the first station 108A, the second station 108B, and the third station 108C, of the route 106. The vehicle 104 may further halt at each of the plurality of stations to pick and drop commuters.

The database server 110 may refer to a computing device that may be communicatively coupled to the communication network 118. In an embodiment, the database server 110 may be configured to perform one or more database operations. The one or more database operations may include one or more of, but not limited to, receiving, storing, processing, and transmitting one or more queries, data, or content. The one or more queries, data, or content may be received/transmitted from/to various components of the system environment 100. In an embodiment, the database server 110 may be configured to store historical demand data for the vehicle 104. The historical demand data may comprise information pertaining to a demand for the vehicle 104 at the plurality of stations along the route 106. The historical demand data may be received from one or more data acquisition devices installed at each of the plurality of stations along the route 106, over the communication network 118. The database server 110 may be further configured to store a plurality of valuation parameters specified by a service provider of the vehicle 104. A valuation parameter may refer to a fare charged to a commuter for availing the vehicle 104 to commute from one station to another station among the plurality of stations of the route, such as the route 106. In an embodiment, the database server 110 may be further configured to store geographical map data of an area. In an embodiment, the database server 110 may be configured to receive one or more queries from the application server 112 for the retrieval of the historical demand data, the plurality of valuation parameters, and the geographical map data.

For querying the database server 110, one or more querying languages, such as, but not limited to, SQL, QUEL, and DMX, may be utilized. In an embodiment, the database server 110 may connect to the application server 112, using one or more protocols, such as, but not limited to, the ODBC protocol and the JDBC protocol. In an embodiment, the database server 110 may be realized through various technologies such as, but not limited to, Microsoft® SQL Server, Oracle®, IBM DB2®, Microsoft Access®, PostgreSQL®, MySQL®, and SQLite®.

The application server 112 may refer to an electronic device, a computing device, or a software framework hosting an application or a software service that may be communicatively coupled to the communication network 118. In an embodiment, the application server 114 may be implemented to execute programs, routines, scripts, and/or the like, stored in one or more memory units for supporting the hosted application or the software service. In an embodiment, the hosted application or the software service may be configured to perform one or more predetermined operations for real time management of transportation services.

In an embodiment, the application server 112 may query the database server 110 to retrieve the historical demand data and the plurality of valuation parameters. The application server 112 may further determine demand distribution information based on the historical demand data. The demand distribution information may represent an association of demand for the vehicle 104 with the plurality of valuation parameters. In an alternate embodiment, the application server 112 may receive the demand distribution information from the one or more data acquisition devices installed at each of the plurality of stations. The one or more data acquisition devices may correspond to one or more ticketing systems installed at each of the plurality of stations, such as the first station 108A, the second station 108B, and the third station 108C.

The application server 112 may further determine a discrete control process with respect to a plurality of states of the vehicle 104. For the determination of the discrete control process, the application server 112 may use one or more statistical frameworks, such as Markov decision model, known in the art. The discrete control process may correspond to a decision model that may be utilized to optimize a key performance parameter as specified by a service provider of the vehicle 104. In an embodiment, the key performance parameter may correspond to a revenue generated by the vehicle 104 or a load of commuters carried by the vehicle 104. The discrete control process may represent the plurality of states of the vehicle 104. Each state in the plurality of states may correspond to a station and a count of vacant seats in the vehicle 104 at the station. For example, if the vehicle 104 with "four" seats is in transit along a route that has "two" stations, such as "S1" and "S2," the plurality of states of the vehicle 104 may be {(1, S1), (2, S1), (3, S1), (4, S1), (1, S2), (2, S2), (3, S2), (4, S2)}. The application server 112 may further utilize the determined discrete control process and the demand distribution information to generate a set of rules to maximize the key performance parameter of the vehicle 104. Along with the demand distribution information, the application server 112 may further use the plurality of valuation parameters as input to the determined discrete control process to generate the set of rules. The set of rules may represent an association between each of the plurality of valuation parameters and a count of the one or more vacant seats at each of the plurality of stations. Alternatively stated, the set of rules may represent an association between each of the plurality of valuation parameters and each of the plurality of states of the vehicle 104.

In an embodiment, the application server 112 may be further configured to use the generated set of rules to determine a valuation parameter from the plurality of valuation parameters for one or more vacant seats in the vehicle 104 at each of one or more subsequent stations in the plurality of stations. The one or more subsequent stations refer to the stations that are subsequent to the real time location of the vehicle 104. In other words, the valuation parameter corresponding to each of the one or more subsequent stations may be determined prior to an arrival of the vehicle 104 at any of the one or more subsequent stations. For a subsequent station in the one or more subsequent stations, the determined valuation parameter is same for each vacant seat at the subsequent station. In an embodiment, the application server 112 may be further configured to transmit the determined valuation parameter corresponding to each of the one or more subsequent stations to the plurality of mobile computing devices associated with the plurality of commuters waiting for the vehicle 104 at the corresponding one or more subsequent stations. The real time management of the transportation services has been explained later in FIG. 3.

The application server 112 may be realized through various types of application servers, such as, but not limited to, a Java application server, a .NET framework application server, a Base4 application server, a PHP framework application server, or any other application server framework.

A person having ordinary skill in the art will appreciate that the scope of the disclosure is not limited to realizing the application server 112 and the database server 110 as separate entities. In an embodiment, the functionalities of the database server 110 can be integrated into the application server 112, without departing from the scope of the disclosure. Further, in an embodiment, the application server 112 may be realized as an application program installed and/or running on the vehicle-computing device 102 and/or the plurality of mobile computing devices, such as the first plurality of mobile computing devices 114A or the second plurality of mobile computing devices 114B, without deviating from the scope of the disclosure.

Each mobile computing device of the plurality of mobile computing devices, such as the first plurality of mobile computing devices 114A and the second plurality of mobile computing devices 114B, may refer to a computing device that may be communicatively coupled to the communication network 118. Each mobile computing device may comprise one or more processors and one or more memory units. The one or more memory units may include computer readable codes and instructions that may be executable by the one or more processors to perform one or more predetermined operations. In an embodiment, each mobile computing device may be associated with a commuter in the plurality of commuters, such as the first plurality of commuters 116A and the second plurality of commuters 116B. For example, the first plurality of mobile computing devices 114A may be associated with the first plurality of commuters 116A waiting for the vehicle 104 at the second station 108B. The second plurality of mobile computing devices 114B may be associated with the second plurality of commuters 116B waiting for the vehicle 104 at the third station 108C. In an embodiment, each mobile computing device in the plurality of mobile computing devices, such as the first plurality of mobile computing devices 114A and the second plurality of mobile computing devices 114B, may receive the determined valuation parameter corresponding to the station at which the corresponding commuter is waiting for the vehicle 104. For example, the first plurality of mobile computing devices 114A may receive the valuation parameter for the one or more vacant seats in the vehicle 104 at the second station 108B. The second plurality of mobile computing devices 114B may receive the valuation parameter for the one or more vacant seats in the vehicle 104 at the third station 108C. In an embodiment, each mobile computing device in the plurality of mobile computing devices may present the information pertaining to a current location of the vehicle 104 and an estimated time of arrival of the vehicle 104 at the corresponding station to the corresponding commuter. The presented information may be rendered through a graphical user-interface (GUI) received from the application server 112, over the communication network 118. An example of the GUI rendered on a mobile computing device is described later in FIG. 5.

Each mobile computing device of the plurality of mobile computing devices, such as the first plurality of mobile computing devices 114A and the second plurality of mobile computing devices 114B, may correspond to a variety of computing devices, such as, but not limited to, a laptop, a PDA, a tablet computer, a smartphone, and a phablet.

The plurality of commuters, such as the first plurality of commuters 116A and the second plurality of commuters 116B, may refer to individuals who may use the vehicle 104 to commute from a source location to a destination location. The plurality of commuters may be waiting at a station for the vehicle 104. For example, the first plurality of commuters 116A may be waiting at the second station 108B to board the vehicle 104. Similarly, the second plurality of commuters 116B may be waiting at the third station 108C to board the vehicle 104. Each commuter of the plurality of commuters may be associated with a mobile computing device. Each of the plurality of commuters may perform a sign-in and a sign-out activity by use of a corresponding access card at the time of boarding and alighting the vehicle 104. Alternatively, each of the plurality of users may perform the sign-in and the sign-out activity by use of a corresponding mobile computing device at the time of boarding and alighting the vehicle 104.

The communication network 118 may correspond to a medium through which content and messages flow among various devices, such as the vehicle-computing device 102, the database server 110, the application server 112, and the plurality of mobile computing devices (such as the first plurality of mobile computing devices 114A and the second plurality of mobile computing devices 114B), of the system environment 100. Examples of the communication network 118 may include, but are not limited to, a the Internet, a cloud network, a Long Term Evolution (LTE) network, Wireless Fidelity (Wi-Fi) network, a Wireless Area Network (WAN), a Local Area Network (LAN), or a Metropolitan Area Network (MAN). Various devices in the system environment 100 can connect to the communication network 118 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

Figure 2:
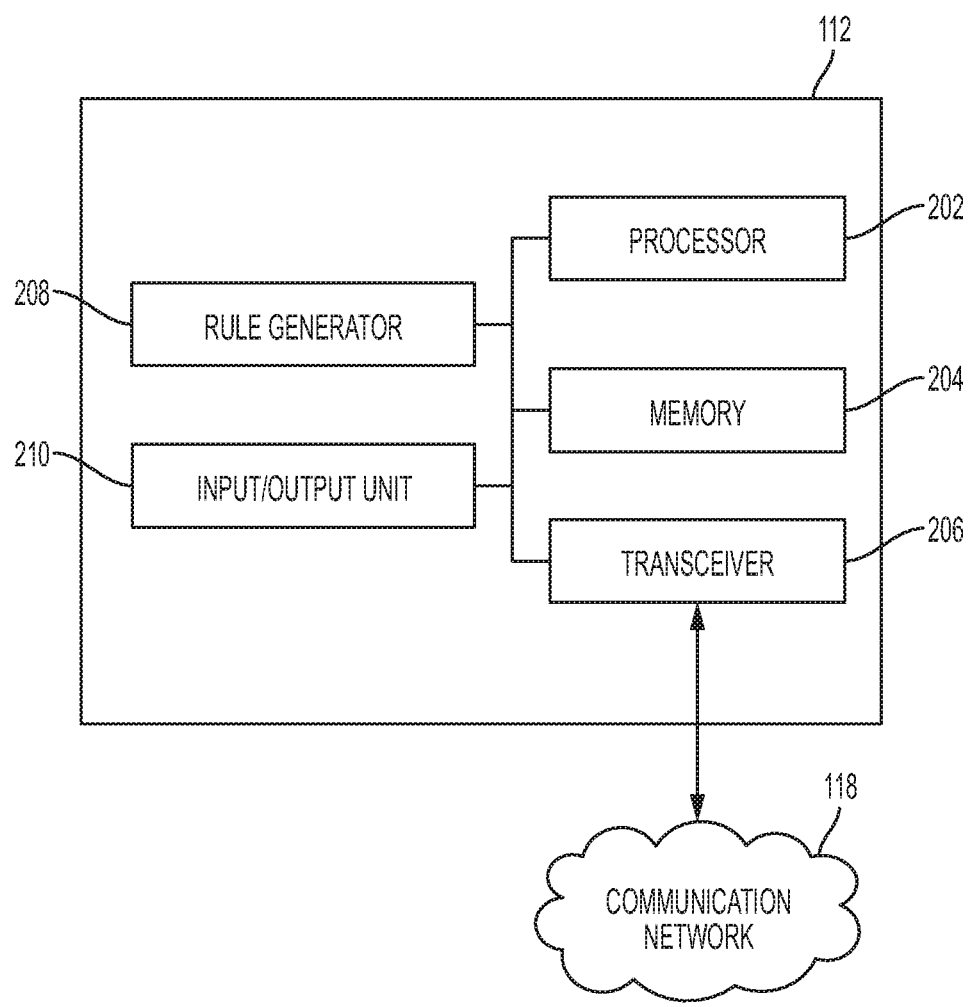
FIG. 2 is a block diagram that illustrates an application server, in accordance with at least one embodiment.

FIG. 2 is a block diagram that illustrates an application server, in accordance with at least one embodiment. FIG. 2 has been described in conjunction with FIG. 1. With reference to FIG. 2, there is shown a block diagram of the application server 112 that may include a processor 202, a memory 204, a transceiver 206, a rule generator 208, and an input/output (I/O) unit 210. The processor 202 is communicatively coupled to the memory 204, the transceiver 206, the rule generator 208, and the I/O unit 210.

The processor 202 includes suitable logic, circuitry, and/or interfaces that may be configured to execute one or more instructions stored in the memory 204. The processor 202 may further comprise an arithmetic logic unit (ALU) (not shown) and a control unit (not shown). The ALU may be coupled to the control unit. The ALU may be configured to perform one or more mathematical and logical operations and the control unit may control the operation of the ALU. The processor 202 may execute a set of instructions/programs/codes/scripts stored in the memory 204 to perform one or more operations for real time management of transportation services. In an embodiment, the processor 202 may be configured to retrieve the historical demand data and the plurality of valuation parameters from the database server 110. The processor 202 may be further configured to determine the demand distribution based on the retrieved historical demand data. The processor 202 may be implemented based on a number of processor technologies known in the art. Examples of the processor 202 may include, but are not limited to, an X86-based processor, a Reduced Instruction Set Computing (RISC) processor, an Application-Specific Integrated Circuit (ASIC) processor, and/or a Complex Instruction Set Computing (CISC) processor.

The memory 204 may be operable to store one or more machine codes, and/or computer programs having at least one code section executable by the processor 202. The memory 204 may store the one or more sets of instructions that are executable by the processor 202, the transceiver 206, the rule generator 208, and the I/O unit 210. In an embodiment, the memory 204 may include one or more buffers (not shown). The one or more buffers may be configured to store the plurality of states of the vehicle 104. The one or more buffers may further store one or more instructions executable by the rule generator 208 for the generation of the set of rules. The one or more buffers may further store the set of rules. Examples of some commonly known memory implementations may include, but are not limited to, a random access memory (RAM), a read only memory (ROM), a hard disk drive (HDD), and a secure digital (SD) card. In an embodiment, the memory 204 may include the one or more machine codes, and/or computer programs that are executable by the processor 202 to perform specific operations for transportation service management. It will be apparent to a person having ordinary skill in the art that the one or more instructions stored in the memory 204 may enable the hardware of the application server 112 to perform the one or more predetermined operations, without deviating from the scope of the disclosure.

The transceiver 206 transmits/receives messages and data to/from various components, such as the vehicle-computing device 102, the database server 110, and the plurality of mobile computing devices (such as the first plurality of mobile computing devices 114A and the second plurality of mobile computing devices 114B), of the system environment 100, over the communication network 116. In an embodiment, the transceiver 206 may be communicatively coupled to the communication network 118. In an embodiment, the transceiver 206 may be configured to receive the real time location of the vehicle 104 from the vehicle-computing device 102, over the communication network 118. In an embodiment, the transceiver 206 may be further configured to transmit the determined valuation parameter to the plurality of mobile computing devices, such as the first plurality of mobile computing devices 114A and the second plurality of mobile computing devices 114B. Examples of the transceiver 206 may include, but are not limited to, an antenna, an Ethernet port, a USB port, or any other port configured to receive and transmit data. The transceiver 206 transmits/receives the messages and data, in accordance with the various communication protocols, such as TCP/IP, UDP, and 2G, 3G, or 4G communication protocols.

The rule generator 208 includes suitable logic, circuitry, and/or interfaces that are configured to execute the one or more sets of instructions stored in the memory 204. In an embodiment, the rule generator 208 may be configured to determine the discrete control process with respect to the plurality of states of the vehicle 104. The rule generator 208 may use one or more statistical frameworks, such as Markov decision model, known in the art for the determination of the discrete control process. The rule generator 208 may further generate the set of rules to maximize the key performance parameter of the vehicle 104 based on the discrete control process. The rule generator 208 may further use the set of rules to determine a valuation parameter from the plurality of valuation parameters for one or more vacant seats in the vehicle 104 at each of one or more subsequent stations. Examples of the rule generator 208 may include, but are not limited to, an X86-based processor, a RISC processor, an ASIC processor, a CISC processor, and/or other processors.

Though the rule generator 208 is depicted as a separate entity, a person skilled in the art will appreciate that the scope of the disclosure is not limited to realizing the functionality of the rule generator 208 by the processor 202. In an embodiment, the rule generator 208 may be implemented within the processor 202 without departing from the spirit of the disclosure. Further, a person skilled in the art will understand that the scope of the disclosure is not limited to realizing the rule generator 208 as a hardware component. In an embodiment, the rule generator 208 may be implemented as a software module included in computer program code (stored in the memory 204), which may be executable by the processor 202 to perform the functionalities of the rule generator 208.

The I/O unit 210 may comprise suitable logic, circuitry, interfaces, and/or code that may be configured to provide an output to a service provider of the vehicle 104. The I/O unit 210 comprises various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

Figure 3:
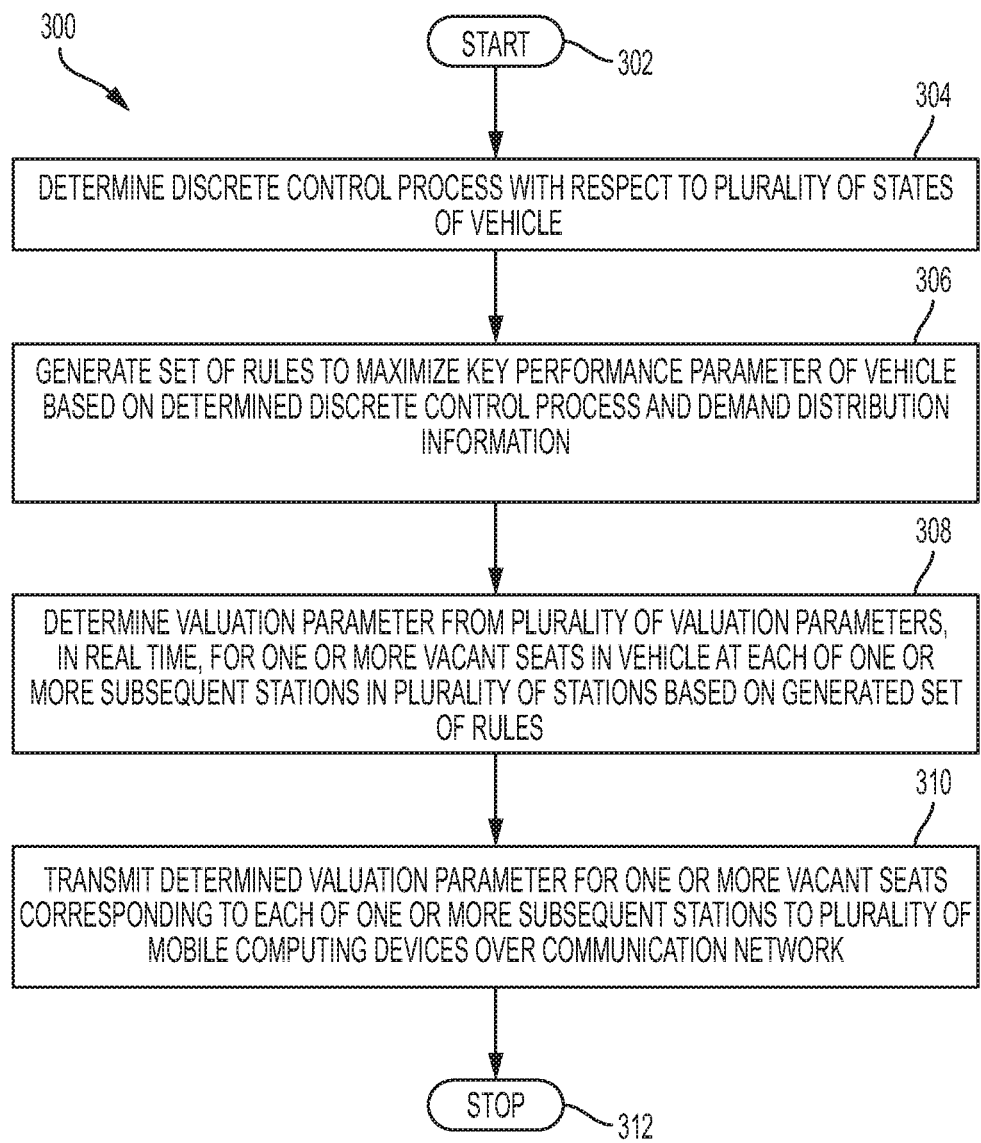
FIG. 3 a flowchart that illustrates a method for real time management of transportation services, in accordance with at least one embodiment.

FIG. 3 is a flowchart that illustrates a method of real time management of transportation services, in accordance with an embodiment. FIG. 3 is described in conjunction with FIG. 1 and FIG. 2. With reference to FIG. 3, there is shown a flowchart 300 that illustrates a method of real time management of transportation services. A person with ordinary skills in the art will understand that for brevity, the method of real time management of transportation services is explained for one vehicle, such as the vehicle 104. Notwithstanding, the disclosure may not be so limited, and the method of real time management of transportation services can be implemented for more than one vehicle, without deviating from the scope of the disclosure. The method starts at step 302 and proceeds to step 304.

At step 304, the discrete control process with respect to the plurality of states of the vehicle is determined. In an embodiment, the rule generator 208 may be configured to determine the discrete control process with respect to the plurality of states of the vehicle 104. In an embodiment, the vehicle 104 may be in transit along the route 106 that comprises the plurality of stations. The plurality of stations may include the first station 108A, the second station 108B, and the third station 108C. Further, each state in the plurality of states of the vehicle 104 may correspond to a station and a count of vacant seats in the vehicle 104 at the station.

For the determination of the discrete control process, the rule generator 208 may be configured to determine the plurality of states of the vehicle 104. In an embodiment, the rule generator 208 may determine the plurality of states of the vehicle 104 based on a vehicle capacity of the vehicle 104 and the plurality of stations of the route 106 along which the vehicle 104 is in transit. In an embodiment, the rule generator 208 may be configured to instruct the vehicle-computing device 102 to transmit information pertaining to the vehicle capacity of the vehicle 104 and the route along which the vehicle 104 is in transit. The rule generator 208 may further query the database server 110 to retrieve the geographical map data. Thereafter, the rule generator 208 may be configured to determine the plurality of stations of the route based on the received route information and the geographical map data retrieved from the database server 110. For example, the route information may include a route identifier of the route 106. The rule generator 208 may identify the route 106 in the geographical map data based on the route identifier. Thereafter, the rule generator 208 may determine the plurality of stations, such as the first station 108A, the second station 108B, and the third station 108C, which are located on the identified route 106. Thereafter, the rule generator 208 may use the received information pertaining to the vehicle capacity and the determined plurality of stations of the route 106 to determine the plurality of states of the vehicle 104. The plurality of states may be represented by equation (1), as shown below:

$$S=\{0,\ldots,L\} \times B \qquad (1)$$

where,

L represents the vehicle capacity of the vehicle 104;

B represents the plurality of stations of the route 106 along which the vehicle 104 is in transit; and S represents the plurality of states of the vehicle 104.

With reference to equation (1), the rule generator 208 may be configured to determine one state for each possible count of the vacant seats in the vehicle 104 at each of the plurality of stations. In an exemplary scenario, the vehicle 104, in transit along a route with "2" stations (such as "S1" and "S2"), may have a vehicle capacity of "four seats." In such a case, the plurality of states of the vehicle 104 may be represented by S={(1, S1), (2, S1), (3, S1), (4, S1), (1, S2), (2, S2), (3, S2), (4, S2)}. The states "(1, S1)," "(2, S1)," "(3, S1)," and "(4, S1)" represent a combination of station "S1" with each possible count of the vacant seats that the vehicle 104 may have at the station "S1." The states "(1, S2)," "(2, S2)," "(3, S2)," and "(4, S2)" further represent a combination of station "S2" with each possible count of the vacant seats that the vehicle 104 may have at the station "S1." Thus, each state of the plurality of states of the vehicle 104 may be represented by equation (2), shown below:

$$s=\{v,b\} \qquad (2)$$

where, v represents a count of vacant seats in the vehicle 104, where v∈{0, . . . , L};

b represents a station, such as the first station 108A, the second station 108B, and the third station 108C, of the plurality of stations B of the route 106; and s represents a state of the plurality of the states of the vehicle 104.

In an alternate embodiment, the rule generator 208 may be configured to receive the plurality of states from the plurality of sensors installed in the vehicle-computing device 102. After the determination of the plurality of states, the rule generator 208 may be configured to determine the discrete control process. The rule generator 208 may use the one or more statistical frameworks, such as Markov decision model, known in the art for the determination of the discrete control process. The discrete control process may be represented by the determined plurality of states. Further, the discrete control process may receive one or more inputs from the rule generator 208 that may transition the vehicle 104 from one state to another state of the plurality of states. The one or more inputs that may transition the vehicle 104 from one state to another state of the plurality of states may correspond to one or more actions. Further, the application of the one or more inputs to the discrete control process may generate one or more rewards. In an embodiment, the rule generator 208 may use the determined discrete control process to maximize the key performance parameter as specified by the service provider of the vehicle 104.

At step 306, the set of rules is generated to maximize the key performance parameter of the vehicle based on the determined discrete control process and demand distribution information. In an embodiment, the rule generator 208 may be configured to generate the set of rules to maximize the key performance parameter of the vehicle 104 based on the determined discrete control process and demand distribution information. Prior to the generation of the set of rules, the processor 202 may be configured to determine the demand distribution information. The demand distribution information may represent information pertaining to a demand for the vehicle 104 at each station of the plurality of stations as a function of the valuation parameter associated with the corresponding station.

For the determination of the demand distribution information, the processor 202 may be configured to retrieve the historical demand data for the vehicle 104 from the database server 110. In another embodiment, the historical demand data may be received from the one or more data acquisition devices (such as the one or more ticketing systems) installed at each of the plurality of stations. The historical demand data may comprise information pertaining to the demand for the vehicle 104 at the plurality of stations along the route 106 collected over a pre-defined interval of time in past. In an exemplary scenario, for the determination of the demand distribution information for the vehicle 104 at a day "D," the information pertaining to the demand (i.e., the historical demand data) for the vehicle 104 at the plurality of stations along the route 106 may be collected over a pre-defined interval of time (such as "10 days") before the day "D." In an embodiment, the demand for the vehicle 104 may represent a count of commuters, who board the vehicle 104 at each of the plurality of stations of the route 106. In an embodiment, the historical data may further comprise information pertaining to an association of each commuter, who boards the vehicle 104 at any station of the plurality of stations, with a valuation parameter. In an exemplary scenario, the valuation parameter may correspond to a fare charged to a commuter for availing the vehicle 104 to commute from one station to another station among the plurality of stations of the route 106. In such a case, the historical demand data may comprise information pertaining to the association of each commuter, who boards the vehicle 104 at any station (such as the first station 108A, the second station 108B, and the third station 108C) of the plurality of stations with the fare charged to the corresponding commuter for availing the vehicle 104 for commutation.

A person having ordinary skill in the art will understand that the scope of the disclosure is not limited to the association of a commuter with one valuation parameter. In an exemplary scenario, the service provider may fix a first valuation parameter, from the plurality of valuation parameters, for travel between the first station 108A and the second station 108B for a day "D1." The service provider may further fix a second valuation parameter, from the plurality of valuation parameters, for travel between the first station 108A and the second station 108B for another day "D2." In this scenario, a commuter may have traveled from the first station 108A to the second station 108B on both days ("D1" and D2"). In such a case, the commuter may be associated with both the valuation parameters, such as the first valuation parameter and the second valuation parameter. However, for some other day "D3," the service provider may fix a third valuation parameter, from the plurality of valuation parameters, for travel between the first station 108A and the second station 108B. The commuter may not have availed the vehicle 104 to travel between the first station 108A and the second station 108B on day "D3." In this scenario, the historical demand data may comprise information of the association of the commuter with the first valuation parameter and the second valuation parameter.

In an exemplary scenario, the determined demand information for a station (such as the first station 108A, the second station 108B, or the third station 108C) of the plurality of stations of the route 106 may be represented by equation (3), as shown below:

$$D_i = \{d_1, d_2, \ldots, d_N\} \quad (3)$$

where, $d_i$ represent demand (i.e., count of commuters) associated with a valuation parameter $v_i$, where $d_i \in \{d_1, d_2, \ldots, d_N\}$ and $c_i \in \{c_1, c_2, \ldots, c_N\}$; and $D_i$ represents demand information for an $i^{th}$ station (such as the first station 108A, the second station 108B, or the third station 108C) of the plurality of stations of the route 106.

A person having ordinary skill in the art will understand that the abovementioned example of demand distribution information is for illustrative purpose and should not be construed to limit the scope of the disclosure. In an alternate embodiment, the demand distribution information may comprise information pertaining to a demand for the vehicle 104 at each station of the plurality of stations as a function of time and the valuation parameter associated with the corresponding station. Further, in an alternate embodiment, the demand distribution information may be determined by the one or more data acquisition devices installed at each of the plurality of stations and thus, the processor 202 may receive the demand distribution information from the one or more data acquisition devices.

After the determination of the demand distribution information, the rule generator 208 may be configured to generate the set of rules based on the demand distribution information. The rule generator 208 may be further configured to provide the plurality of valuation parameters as input to the determined discrete control process for the generation of the set of rules. The rule generator 208 may provide the plurality of valuation parameters in a sequential order, such as ascending order or descending order, to the discrete control process. The rule generator 208 may be further configured to provide a "null" input to the discrete control process.

In an embodiment, the application of inputs to the discrete control process may transition the vehicle 104 from a first state to a second state of the plurality of states. For example, the vehicle 104 may be in a first state of the plurality of states, prior to the application of a valuation parameter of the plurality of valuation parameters as input to the discrete control process. The first state may be associated with a first station, such as the first station 108A, of the route 106. Further, the application of the valuation parameter as input to the discrete control process may transit the vehicle 104 from the first state to a second state of the plurality of states. The second state may be associated with a second station, such as the second station 108B, which is next to the first station, such as the first station 108A. In an embodiment, the rule generator 208 may be configured to determine a likelihood of the transition of the vehicle 104 from the first state to the second state. The determined likelihood may be a function of count of commuters alighting the vehicle 104 at the second station and a count of commuters boarding the vehicle 104 at the second station. Thus, the rule generator 208 may be configured to determine the count of commuters alighting the vehicle 104 at each of the plurality of stations and the count of commuters boarding the vehicle 104 at each of the plurality of stations (such as the first station 108A, the second station 108B, and the third station 108C) based on the demand distribution information. In another embodiment, the count of commuters alighting the vehicle 104 and the count of commuters boarding the vehicle 104 may be determined based on the historical demand data.

For example, the historical demand data may comprise information of the sign-in and the sign-out activity of the plurality of commuters, such as the first plurality of commuters 116A and the second plurality of commuters 116B. Thus, the rule generator 208 may use the information of the sign-in and the sign-out activity of the plurality of commuters to identify a boarding and alighting station of each of the plurality of commuters. Thus, based on the identification of the boarding and alighting station of each of the plurality of commuters, the rule generator 208 may determine the count of commuters alighting the vehicle 104 at the second station and a count of commuters boarding the vehicle 104.

The determined likelihood of transition of the vehicle 104 from the first state $(s_i)$ to the second state $(s_j)$, when a valuation parameter $(c_k)$ is provided as input to the discrete control process may be represented as $P(s_j|s_i,c_k)$. Each state in the plurality of states may represented by two components, such as a station and a count of vacant seats in the vehicle 104 at the station. The transition of the vehicle 104 from the first state $(s_i)$ to the second state $(s_j)$ of the plurality of states may include a transition of the count of vacant seats at the first station (in the first state $(s_i)$) to a new count of vacant seats at the second station (in the second state $(s_j)$). Further, the transition of the count of vacant seats may correspond to a two-step transition. For example, a first step of transition may include a transition in the count of vacant seats due to alighting of commuters from the vehicle 104 at the second station (in the second state $(s_j)$) and a second step of transition may include a transition of the count of vacant seats due to boarding of the vehicle 104 by the commuters at the second station (in the second state $(s_j)$). In an embodiment, the count of commuters boarding the vehicle 104 at a station of the plurality of stations may be dependent on a valuation parameter associated with the station. In an embodiment, the determination of the commuters associated with the input valuation parameter may be based on the demand distribution information. In an embodiment, the rule generator 208 may use the "null" input to perform the first step of the transition. For example, the application of the "null" input to the discrete control process may correspond to commuters alighting at any station. In an embodiment, the rule generator 208 may further use determined likelihood for the generation of the set of rules to maximize the key performance parameter as specified by the service provider of the vehicle 104. For the sake of brevity, below mentioned exemplary scenario for the generation of the set of rules is explained with respect to a current state $s_1$, in the plurality of states of the vehicle 104.

In an exemplary scenario, the vehicle 104 may be in the current state $s_1$. The current state $s_1$ may correspond to a station $b_1$ (of the plurality of stations of the route 106) and a count of vacant seats $v_t$ in the vehicle 104 at the station $b_1$. The rule generator 208 may provide the "null" input to the discrete control process to generate an intermediate state $s_1'$ that represents the first step of transition. At the intermediate state $s_1'$, the station $b_1$ transitions to a station $b_2$ (i.e., a station next to the station $b_1$ along the route 106) and the count of vacant seats $v_t$ transitions to a new count of vacant seats $v_t'$. The new count of vacant seats may be a result of commuter alighting at the station $b_2$. The rule generator 208 may be configured to determine the new count of vacant seats $v_t'$ based on a likelihood of transition of the count of vacant seats $v_t$ to the new count of vacant seats $v_t'$ at the station $b_2$. In an embodiment, the count of vacant seats $v_t$ may be lesser than or equal to the new count of vacant seats $v_t'$. The likelihood of transition of the count of vacant seats $v_t$ to the new count of vacant seats $v_t'$ at the station $b_2$ may be determined based on the historical demand data by use of one or more known data distribution techniques, such as Binomial distribution. For example, the determined likelihood ($P_{alight}$) of transition of the count of vacant seats $v_t$ to the new count of vacant seats $v_t'$ at the station $b_2$ may be represented by equation (4), as shown below:

$$P_{alight}(s_1' = \langle i, b_2 \rangle \mid s_1 = \langle v_t, b_1 \rangle) = \begin{cases} 0 \text{ for } i < v_t \\ \lambda_{b_2}^{(i-v_t)}(1-\lambda_{b_2})^{(C-i)} \text{ for } v \leq i \leq C \\ 0 \text{ for } i > c \end{cases} \quad (4)$$

where,

C represents the vehicle capacity of the vehicle 104;

$\lambda_b$ represents a likelihood that a commuter in the vehicle 104 may alight the vehicle 104 at the station $b_2$; and i represents a new count of vacant seats transitioned from the count of vacant seats $v_t$.

In an embodiment, the application of the "null" input to the discrete control process may not generate any reward. After the application of the "null" input, the vehicle 104 may be in the intermediate state $s_1'$. The rule generator 208 may be further configured to provide each of the plurality of valuation parameters (such as $\{c_1, c_2, c_3\}$) as input to the discrete control process. The application of each of the plurality of valuation parameters (such as $\{c_1, c_2, c_3\}$) may transition the intermediate state $s_1'$ of the vehicle 104 to a different state, associated with the corresponding station, of the plurality of states. In other words, the application of the valuation parameter $c_1$ to the discrete control process may transition the intermediate state $s_1'$ of the vehicle 104 to a state $s_2^{c_1}$, which may be different from the states (such as $s_2^{c_2}$ and $s_2^{c_3}$) transitioned due to the application of the valuation parameters $c_2$ and $c_3$, respectively, to the discrete control process.

A person having ordinary skill in the art will understand that the abovementioned example of the plurality of valuation parameters is for illustrative purpose and should not be construed to limit the scope of the disclosure.

At the state $s_2^{c_1}$, the count of vacant seats $v_t'$ transitions to a new count of vacant seats $v_{t+1}^{c_1}$. The new count of vacant seats $v_{t+1}^{c_1}$ may be a result of commuters boarding the vehicle 104 at the station $b_2$. The rule generator 208 may be configured to determine the new count of vacant seats $v_{t+1}^{c_1}$ based on a likelihood of transition of the count of vacant seats $v_t'$ to the new count of vacant seats $v_{t+1}^{c_1}$ at the station $b_2$. In an embodiment, the count of vacant seats $v_t'$ may be greater than or equal to the new count of vacant seats $v_{t+1}^{c_1}$. The likelihood of transition of the count of vacant seats $v_t'$ to the new count of vacant seats $v_{t+1}^{c_1}$ at the station $b_2$ may be determined based on the demand distribution information by use of one or more known data distribution techniques, such as Poisson distribution. For example, the determined likelihood ($P_{arrival}$) of transition of the count of vacant seats $v_t'$ to the new count of vacant seats $v_{t+1}^{c_1}$ at the station $b_2$ may be represented by equation (5), as shown below:

$$P_{arrival}(s_2^{c_i} = \langle i, b_2 \rangle \mid s_1' = \langle v_t', b_2 \rangle) = \begin{cases} 0 \text{ for } i < v_t' \\ P_{Poisson}(v_t' - i \mid \lambda) \text{ for } 0 < i \leq v_t' \\ P_{Poisson}(\geq v_t' \mid \lambda) \text{ for } i = 0 \end{cases} \quad (5)$$

where, $\lambda$ represents a rate parameter of the Poisson distribution; and i represents a new count of vacant seats, such as $v_{t+1}^{c_1}$, transitioned from the count of vacant seats $v_t'$.

A person having ordinary skill in the art will understand that the abovementioned example is for illustrative purpose and should not be construed to limit the scope of the disclosure.

The rule generator 208 may be configured to apply the "null" input and each of the plurality of valuation parameters to each of the plurality of states of the vehicle 104 as applied for the current state $s_1$. In an embodiment, the discrete control process may generate a reward as output corresponding to each transition. Thereafter, based on the generated rewards corresponding to each transition, the rule generator 208 may be configured to generate the set of rules to maximize the key performance parameter.

In an exemplary scenario, the key performance indicator may correspond to revenue generated by the service provider from the vehicle 104 and the plurality of valuation parameters may correspond to a plurality of fares that are to be charged by the service provider. Further, the reward of each transition of the vehicle 104 may correspond to revenue generated by the application of the corresponding valuation parameter. The reward of each transition of the vehicle 104, when the key performance indicator corresponds to revenue generated, may be represented by equation (6), as shown below:

$$\text{Reward} = R(s_t', s_t, \emptyset) + R(s_{t+1}, s_t', c_t) \quad (6)$$

where, $\emptyset$ represents the "null" input provided to the discrete control process;

$R(s_t', s_t, \emptyset)$ represents the reward generated (i.e., "0"), when the state $s_t$ of the vehicle 104 transitions to an intermediate state $s_t'$ due the application of the "null" input $\emptyset$ to the discrete control process; and $R(s_{t+1}, s_t', c_t)$ represents the reward generated (i.e., $c_t(v_t'-v_{t+1})$) when the intermediate state $s_t'$ of the vehicle 104 transitions to the next state $s_{t+1}$ due the application of the valuation parameter $c_t$, of the plurality of valuation parameters, to the discrete control process.

In another exemplary scenario, the key performance indicator may correspond to the load of commuters carried by the vehicle 104 and the plurality of valuation parameters may correspond to the plurality of fares that are to be charged by the service provider. The reward of each transition of the vehicle 104, when the key performance indicator corresponds to the load of commuters carried by the vehicle 104, may be represented by equation (7), as shown below:

$$\text{Reward} = R(s_t', s_t, \emptyset) + R(s_{t+1}, s_t', c_t) \quad (7)$$

where, $\emptyset$ represents the "null" input provided to the discrete control process;

$R(s_t', s_t, \emptyset)$ represents the reward generated (i.e., "0"), when the state $s_t$ of the vehicle 104 transitions to an intermediate state $s_t'$ due the application of the "null" input $\emptyset$ to the discrete control process; and $R(s_{t+1}, s_t', c_t)$ represents the reward generated (i.e., a Boolean variable), when the intermediate state $s_t'$ of the vehicle 104 transitions to the next state $s_{t+1}$ due the application of the valuation parameter $c_t$, of the plurality of valuation parameters, to the discrete control process. In an embodiment, $R(s_{t+1}, s_t', c_t)=1$, if $\theta_{lower} < v_{t+1} < \theta_{upper}$, else $R(s_{t+1}, s_t', c_t)=0$, where $\theta_{lower}$ may correspond to a lower load threshold and $\theta_{upper}$ may correspond to an upper load threshold.

A person having ordinary skill in the will understand that the scope of the key performance parameter is not limited to the revenue generated by the vehicle 104 or the load carried by the vehicle 104.

In an embodiment, the rule generator 208 may be further configured to determine a sum of the rewards of the discrete control process by use of equation (8), as shown below:

$$\text{Sum of Rewards}(J) = \Sigma_{t=0}^{M} R(s_t', s_t, \emptyset) + R(s_{t+1}, s_t', c_t) \quad (8)$$

where, $\emptyset$ represents a count of stations in the plurality of stations along the route 106.

In an embodiment, the rule generator 208 may be further configured to maximize the determined sum of rewards of the discrete control process to generate the set of rules. The maximization of the sum of the rewards may further maximize the key performance indicator of the vehicle 104 as specified by the service provider by using equations (9) and (10), as shown below.

$$V(s = \langle v, b \rangle) = \sum_{s', s''} P(s', s'' \mid s = \langle v, b \rangle)(R(s', s'') + V(s'')) \quad (9)$$

$$\pi(s = \langle v, b \rangle) = \underset{c}{\text{argmax}} \sum_{s', s''} P(s', s'' \mid s = \langle v, b \rangle)(R(s', s'') + V(s'')) \quad (10)$$

where, $P(s', s'' \mid s=\langle v, b \rangle)$ represents a likelihood of transition of the vehicle from state s to states s' and s", where s' may represent an intermediate state and s" may represent the next state;

$R(s', s'')$ represents the reward generated at the transition to state s' and s"; and $V(s'')$ represents an average sum of rewards to be generated when the vehicle 104 is in state s".

With reference to equations (9) and (10), the rule generator 208 may apply equations (9) and (10) iteratively until the sum of the rewards is maximized (i.e., the sum of the rewards converges to a single value that remains constant for further iterations of equations (9) and (10)). Equation (10) represents the determined set of rules $\pi(s=\langle v, b \rangle)$.

For example, Table 1 shown below illustrates a set of rules generated by the rule generator 208 to maximize the key performance parameter (such as the revenue generated or a load of commuters) of the vehicle 104 in transit along the route 106.

TABLE 1

| | A set of rules | | |
|---|---|---|---|
| | Valuation parameter at stations along the route 106 of transit | | |
| Count of vacant seats in the vehicle 104 | Valuation parameter at First station 108A | Valuation parameter at Second station 108B | Valuation parameter at Third station 108C |
| 5 | $C_2$ | $C_2$ | $C_2$ |
| 4 | — | $C_2$ | $C_2$ |
| 3 | — | $C_2$ | $C_1$ |
| 2 | — | $C_1$ | $C_1$ |
| 1 | — | $C_1$ | $C_1$ |

With reference to Table 1, each cell in the table may correspond to a state. For example, the cell (represented by $4^{th}$ row and $3^{rd}$ column) may correspond to a state representing the vehicle 104 at the second station 108B with a count of "four" vacant seats. Further, in an embodiment, the valuation parameter "$C_1$" may be larger than the valuation parameter "$C_2$." In an embodiment, the rule generator 208 may be configured to store the generated set of rules in the database server 110.

At step 308, a valuation parameter may be determined from the plurality of valuation parameters, in real time, for one or more vacant seats in the vehicle at each of the one or more subsequent stations in the plurality of stations based on the generated set of rules. In an embodiment, the rule generator 208 may be configured to determine a valuation parameter from the plurality of valuation parameters, in real time, for one or more vacant seats in the vehicle 104 at each of the one or more subsequent stations in the plurality of stations based on the generated set of rules.

Prior to the determination of the valuation parameter, the rule generator 208 may be configured to receive information pertaining to a count of vacant seats in the vehicle 104. The information pertaining to the count of vacant seats in the vehicle 104 may be received from the vehicle-computing device 102. In an exemplary scenario, the vehicle 104 may start the travel from the first station 108A of the route 106. Thus, before reaching the first station 108A, the count of vacant seats in the vehicle 104 is same as the vehicle capacity (such as "five") of the vehicle 104. The vehicle-computing device 102 may transmit the information pertaining to the count of vacant seats (i.e., "five") in the vehicle 104 corresponding to the first station 108A. A plurality of commuters, who may be waiting for at for the vehicle 104 at the first station 108A may board the vehicle 104, when the vehicle 104 reaches the first station 108A. Thus, the count of vacant seats in the vehicle 104 may change based on a count of commuters (such as "two" commuters) boarding the vehicle 104 at the first station 108A. The vehicle-computing device 102 may further transmit the information pertaining to the new count of vacant seats (i.e., "three") in the vehicle 104 corresponding to the second station 108B. Similarly, the count of vacant seats in the vehicle 104 may change, when the vehicle 104 reaches any station, such as the second station 108B or the third station 108C, of the route 106. The vehicle-computing device 102 may be configured to transmit the information pertaining to the new count of vacant seats corresponding to each station to the rule generator 208.

After the reception of the information pertaining to the count of vacant seats in the vehicle 104, the rule generator 208 may be configured to determine the valuation parameter for the corresponding station based on the generated set of rules. For example, based on the received information, the rule generator 208 may identify that at the time instant the vehicle 104 reaches the first station 108A, the count of vacant seats in the vehicle 104 will be "five." Thus, based on the generated set of rules (i.e., with reference to Table 1), the rule generator 208 may determine a valuation parameter, such as "$C_2$," for the first station 108A. The determined valuation parameter may correspond to a fare to be charged to each commuter, who may board the vehicle 104 at the first station 108A. For an instance, "two" commuters may board the vehicle 104 at the first station. In such a case, the rule generator 208 may determine that the count of vacant seats in the vehicle 104, when the vehicle 104 reaches the second station 108B may be "three." Thus, based on the generated set of rules (i.e., with reference to Table 1), the rule generator 208 may determine a valuation parameter, such as "$C_2$," for the second station 108B. The determined valuation parameter may correspond to a fare to be charged to each commuter who may board the vehicle 104 at the second station 108B. The rule generator 208 may further utilize the demand distribution information to predict a count of commuters who may board the vehicle 104 and a count of commuters who may alight the vehicle 104 at the second station 108B. Thus, based on the predicted count of commuters, the rule generator 208 may predict the count of vacant seats the vehicle 104 may have when the vehicle 104 reaches the third station 108C. For an instance, the rule generator 208 may predict the count of vacant seats the vehicle 104 may have when the vehicle 104 reaches the third station 108C is "one." In such a case, based on the generated set of rules (i.e., with reference to Table 1), the rule generator 208 may determine a valuation parameter, such as "$C_1$," for the third station 108C. The determined valuation parameter may correspond to a fare to be charged to each commuter who may board the vehicle 104 at the third station 108C.

A person having ordinary skill in the art will understand that the abovementioned exemplary scenario is for illustrative purpose and should not be construed to limit the scope of the disclosure.

In an embodiment, the predicted count of vacant seats in the vehicle 104 at the one or more subsequent stations may be different from an actual count of vacant seats. In such a case, the rule generator 208 may be configured to update the determined valuation parameter based on the actual count of vacant seats at the corresponding station. For example, when the vehicle 104 is at the first station 108A, the rule generator 208 may predict a count of vacant seats (such as "one" seat) the vehicle 104 may have when the vehicle 104 reaches the third station 108C. Thus, the rule generator 208 may determine the valuation parameter "$C_1$" for the vehicle 104 corresponding to the third station 108C. However, when the vehicle 104 reaches the second station 108B, due to one or more commuters boarding and alighting the vehicle 104 at the second station 108B, the actual count of vacant seats in the vehicle 104 is determined to be "four" seats. In such a case, the rule generator 208 may update the determined valuation parameter from "$C_1$" to "$C_2$" for the third station 108C.

A person having ordinary skill in the art will understand that the abovementioned exemplary scenario is for illustrative purpose and should not be construed to limit the scope of the disclosure.

At step 310, the determined valuation parameter for the one or more vacant seats corresponding to each of the one or more subsequent stations is transmitted to the plurality of mobile computing devices over the communication network. In an embodiment, the rule generator 208 may be configured to transmit the determined valuation parameter for the one or more vacant seats corresponding to each of the one or more subsequent stations, such as the first station 108A, the second station 108B, or the third station 108C, to the plurality of mobile computing devices over the communication network 118. The rule generator 208, in conjunction with the transceiver 206, may be configured to transmit the determined valuation parameter corresponding to each of the one or more subsequent stations to the plurality of mobile computing devices associated with a plurality of commuters waiting for the vehicle 104 at the corresponding one or more subsequent stations. For example, the first plurality of commuters 116A may be waiting for the vehicle 104 at the second station 108B and the second plurality of commuters 116B may be waiting for the vehicle 104 at the third station 108C. In such a scenario, the rule generator 208 may transmit the determined valuation parameter for the one or more vacant seats corresponding to the second station 108B to the first plurality of mobile computing devices 114A associated with the first plurality of commuters 116A waiting for the vehicle 104 at the second station 108B. Similarly, the rule generator 208 may transmit the determined valuation parameter for the one or more vacant seats corresponding to the third station 108C to the second plurality of mobile computing devices 114B associated with the second plurality of commuters 116B waiting for the vehicle 104 at the third station 108C.

In an embodiment, the rule generator 208 may be configured to transmit the determined valuation parameter to the plurality of mobile devices prior to the arrival of the vehicle 104 at the corresponding one or more subsequent stations. For example, the rule generator 208 may transmit the determined valuation parameter for the one or more vacant seats corresponding to the third station 108C to the second plurality of mobile computing devices 114B, prior to the arrival of the vehicle 104 at the third station 108C. In an embodiment, the rule generator 208 may be further configured to transmit the updated valuation parameter to the plurality of mobile computing devices prior to the arrival of the vehicle 104 at the corresponding one or more subsequent stations. For example, the rule generator 208 may transmit the updated valuation parameter for the one or more vacant seats corresponding to the third station 108C to the second plurality of mobile computing devices 114B, prior to the arrival of the vehicle 104 at the third station 108C.

A person having ordinary skill in the art will understand that the abovementioned exemplary scenario is for illustrative purpose and should not be construed to limit the scope of the disclosure. Control passes to end step 312.

Figure 4A:
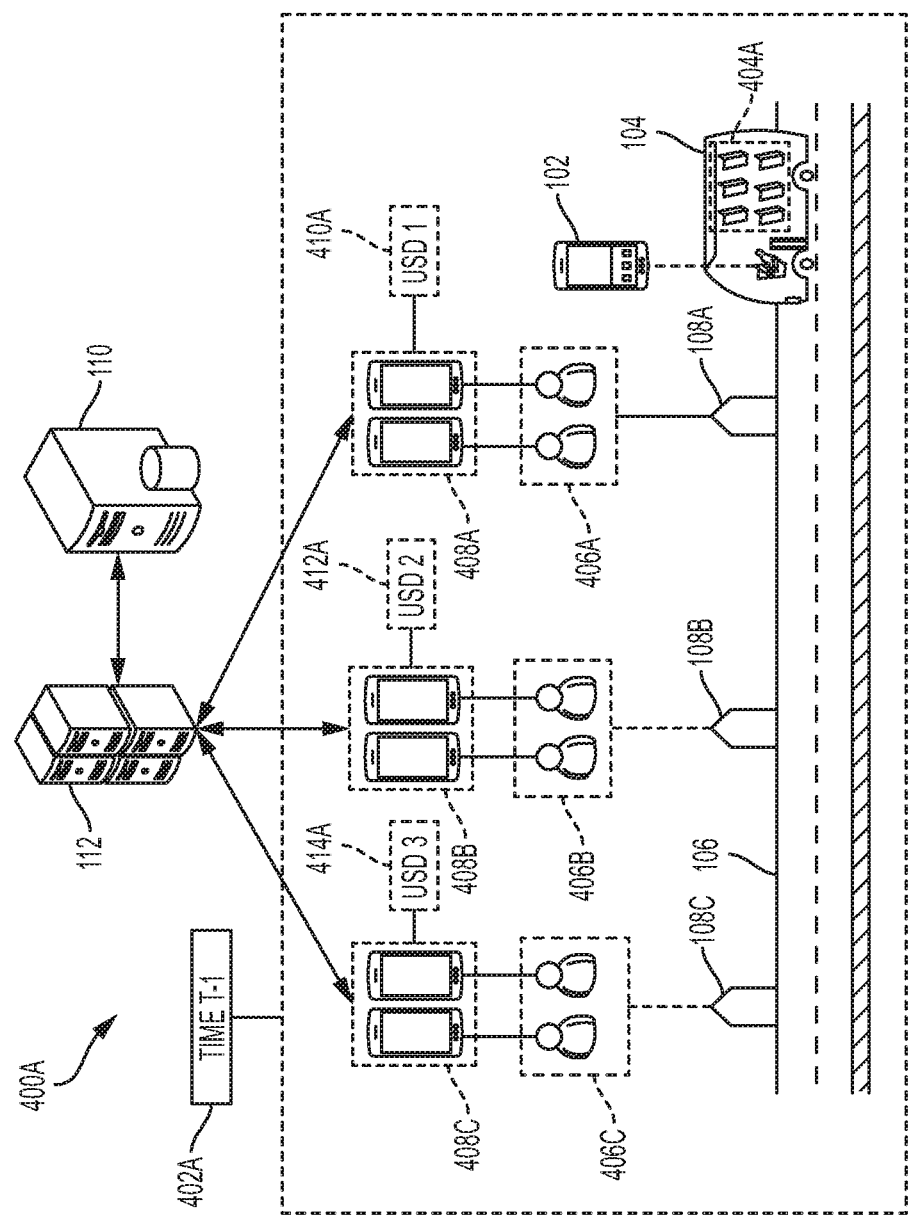
FIGS. 4A, 4B, and 4C, collectively, illustrate an exemplary scenario for real time management of transportation services, in accordance with at least one embodiment.
Figure 4B:
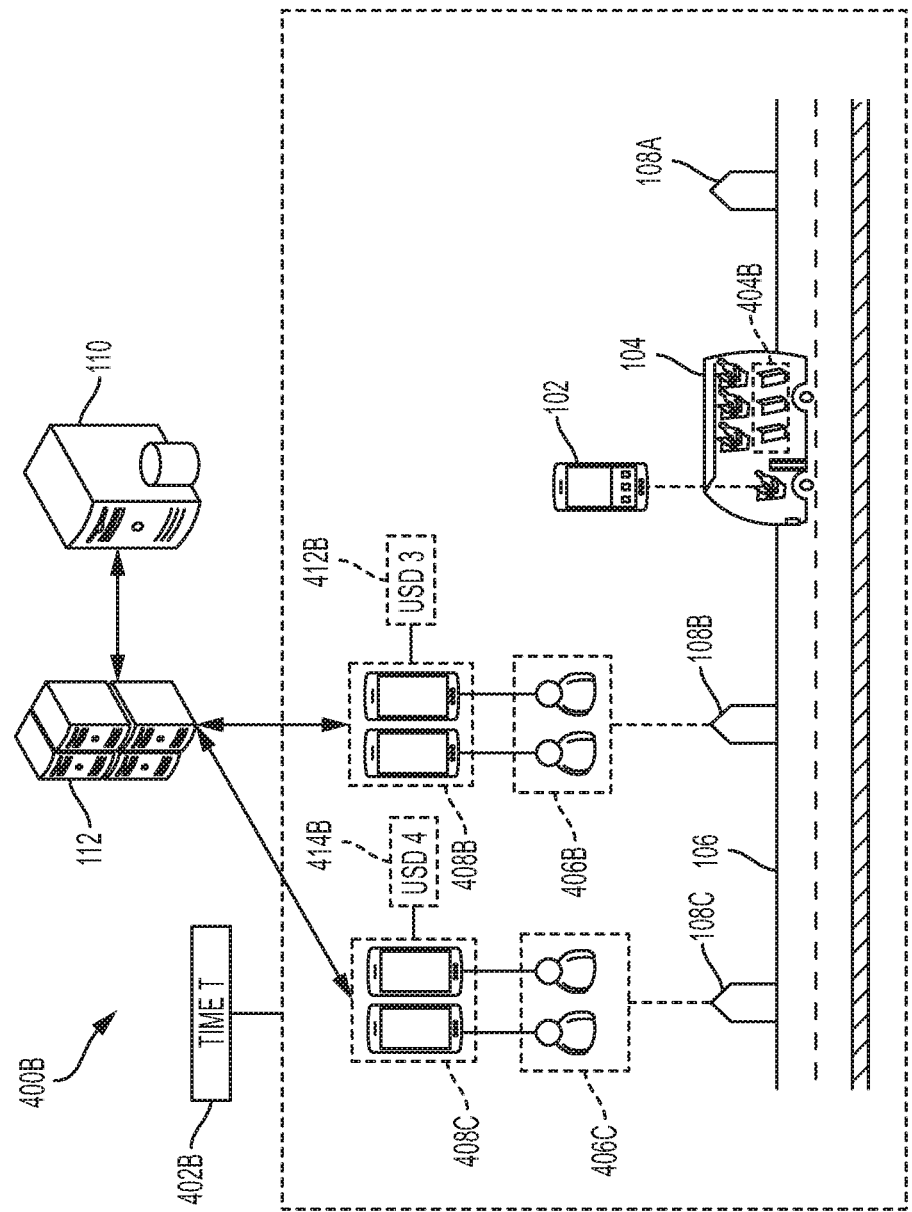
Figure 4C:
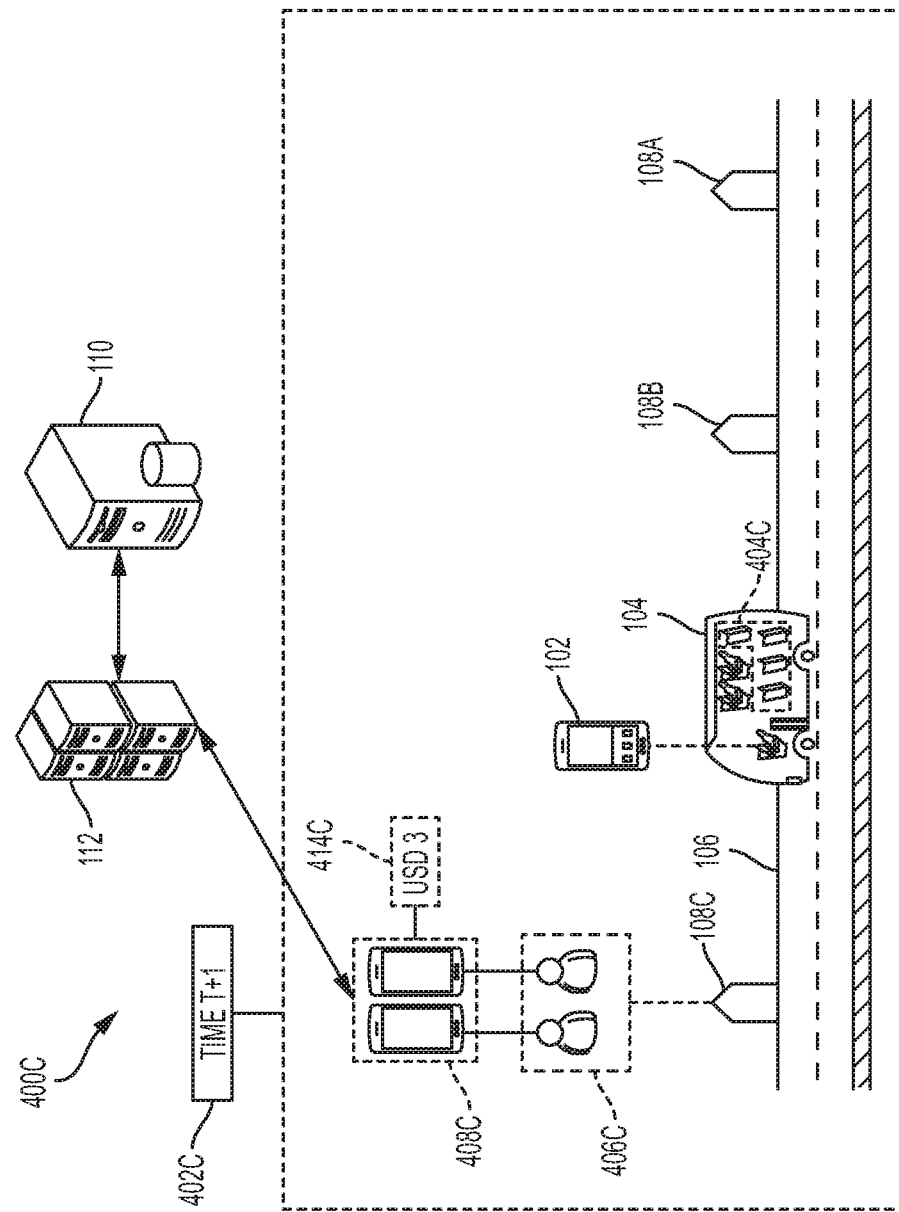

FIGS. 4A, 4B, and 4C, collectively, illustrate an exemplary scenario for real time management of transportation services, in accordance with at least one embodiment. FIGS. 4A, 4B, and 4C, have been described in conjunction with FIG. 1, FIG. 2, and FIG. 3. With reference to FIG. 4A, there is shown a first exemplary scenario 400A with respect to a first time instant "T−1" 402A. The first exemplary scenario 400A illustrates the vehicle-computing device 102 associated with the vehicle 104. The vehicle 104 may be traveling along the route 106 that comprises the plurality of stations, such as the first station 108A, the second station 108B, and the third station 108C. The first station 108A may correspond to an initial station of the route 106. There is further shown the application server 112 and the database server 110.

At the first time instant "T−1" 402A, the vehicle 104 may be dispatched from a vehicle depot to transit along the route 106, such that the current location of the vehicle 104 is prior to the first station 108A. At the first time instant "T−1" 402A, the vehicle 104 may be empty. Thus, a first count of vacant seats 404A in the vehicle 104 may be same as the vehicle capacity (such as "six") of the vehicle 104. Further, a first plurality of commuters 406A associated with a first plurality of mobile computing devices 408A may be waiting for the vehicle 104 at the first station 108A. A second plurality of commuters 406B associated with a second plurality of mobile computing devices 408B may be waiting for the vehicle 104 at the second station 108B. A third plurality of commuters 406C associated with a third plurality of mobile computing devices 408C may be waiting for the vehicle 104 at the third station 108C. The first plurality of mobile computing devices 408A, the second plurality of mobile computing devices 408B, and the third plurality of mobile computing devices 408C may be similar to the first plurality of mobile computing devices 114A or the second plurality of mobile computing devices 114B.

At the first time instant "T−1" 402A, the vehicle-computing device 102 may transmit the information pertaining to the count of vacant seats 404A in the vehicle 104 to the application server 112. For the determination of the valuation parameter for one or more vacant seats in the vehicle 104 at each of one or more subsequent stations, the application server 112 may be configured to retrieve the set of rules stored in the database server 110. The application server 112 may have generated the set of rules by performing the steps 302 to 312 as described in FIG. 3. At the first time instant "T−1" 402A, the one or more subsequent stations may include the first station 108A, the second station 108B, and the third station 108C. The application server 112 may use the retrieved set of rules illustrated in Table 2, as shown below, to determine the valuation parameter for one or more vacant seats in the vehicle 104 at each of one or more subsequent stations.

TABLE 2

A set of rules

| Count of vacant seats in the vehicle 104 | Valuation parameter at stations along the route 106 of transit | | |
| --- | --- | --- | --- |
| | Valuation parameter at First station 108A | Valuation parameter at Second station 108B | Valuation parameter at Third station 108C |
| 6 | USD 1 | USD 1 | USD 1 |
| 5 | — | USD 1 | USD 2 |
| 4 | — | USD 2 | USD 3 |
| 3 | — | USD 3 | USD 4 |
| 2 | — | USD 4 | USD 4 |
| 1 | — | USD 4 | USD 4 |

The application server 112 may determine a valuation parameter 410A (i.e., "USD 1") for one or more vacant seats (i.e., "six" vacant seats) in the vehicle 104 at the first station 108A by use of the set of rules (with reference to Table 2). The application server 112 may further predict a count of vacant seats in the vehicle 104 when the vehicle 104 may reach the second station 108B and the third station 108C, based on the determined demand distribution information. The application server 112 may retrieve the demand distribution information from the database server 110. The application server 112 may predict the count of vacant seats in the vehicle 104, when the vehicle 104 reaches the second station 108B, to be "four." Thus, based on the predicted count of vacant seats in the vehicle 104 at the second station 108B and the set of rules (with reference to Table 2), the application server 112 may determine a valuation parameter 412A (i.e., "USD 2") for each of the predicted one or more vacant seats (i.e., "four" vacant seats) in the vehicle 104. The application server 112 may further predict the count of vacant seats in the vehicle 104, when the vehicle 104 reaches the third station 108C, to be "four." Thus, based on the predicted count of vacant seats in the vehicle 104 at the third station 108C and the set of rules (with reference to Table 2), the application server 112 may determine a valuation parameter 414A (i.e., "USD 3") for each of the predicted one or more vacant seats (i.e., "four" vacant seats) in the vehicle 104.

The application server 112 may further transmit the valuation parameter 410A to each of the first plurality of mobile computing devices 408A associated with the first plurality of commuters 406A waiting for the vehicle 104 at the first station 108A. The application server 112 may further transmit the valuation parameter 412A to each of the second plurality of mobile computing devices 408B associated with the second plurality of commuters 406B waiting for the vehicle 104 at the second station 108B. Furthermore, the application server 112 may transmit the valuation parameter 414A to each of the third plurality of mobile computing devices 408C associated with the third plurality of commuters 406C waiting for the vehicle 104 at the third station 108C. The transmission of the valuation parameters (such as the valuation parameter 410A, the valuation parameter 412A, and the valuation parameter 414A) is prior to the arrival of the vehicle 104 at the corresponding subsequent station.

With reference to FIG. 4B, there is shown a second exemplary scenario 400B with respect to a second time instant "T" 402B. At the second time instant "T" 402B, the vehicle 104 may have left the first station 108A to proceed towards the second station 108B. The current location of the vehicle 104, at the second time instant "T" 402B, may be prior to the second station 108B. Further, due to boarding of the first plurality of commuters 406A at the first station 108A, the count of vacant seats 404B in the vehicle at the second time instant "T" 402B, may be "three." At the second time instant "T" 402B, the vehicle-computing device 102 may transmit the information pertaining to the count of vacant seats 404B in the vehicle 104 to the application server 112. Based on the received information, the application server 112 may determine that when the vehicle 104 reaches the second station 108B, there will be "three" vacant seats in the vehicle 104. Therefore, the count of vacant seats (i.e., "four") that was predicted at the first time instant "T−1" 402A for the second station 108B is different from the actual count of vacant seats 404B (i.e., "three") at the second time instant "T" 402B. Thus, the application server 112 may update the valuation parameter 412A (i.e., "USD 2") to a valuation parameter 412B (i.e., "USD 3" with reference to Table 2). Further, based on the demand distribution, the application server 112 may predict the count of vacant seats in the vehicle 104, when the vehicle 104 reaches the third station 108C to be "two." Thus, based on the predicted count of vacant seats in the vehicle 104 at the third station 108C and the set of rules (with reference to Table 2), the application server 112 may update the valuation parameter 414A (i.e., "USD 3") to a valuation parameter 414B (i.e., "USD 4") for each of the predicted one or more vacant seats (i.e., "two" vacant seats) in the vehicle 104.

The application server 112 may further transmit the valuation parameter 412B to each of the second plurality of mobile computing devices 408B associated with the second plurality of commuters 406B waiting for the vehicle 104 at the second station 108B, in real time. The application server 112 may further transmit the valuation parameter 414B to each of the third plurality of mobile computing devices 408C associated with the third plurality of commuters 406C waiting for the vehicle 104 at the third station 108C, in real time. The transmission of the valuation parameters (such as the valuation parameter 412B and the valuation parameter 414B) is prior to the arrival of the vehicle 104 at the corresponding subsequent station.

With reference to FIG. 4C, there is shown a third exemplary scenario 400C with respect to a third time instant "T+1" 402C. At the third time instant "T+1" 402C, the vehicle 104 may have left the second station 108B to proceed towards the third station 108C. The current location of the vehicle 104, at the third time instant "T+1" 402C, may be prior to the third station 108C. Further, due to boarding of the second plurality of commuters 406B at the second station 108B and alighting of one or more commuters from the vehicle 104, the count of vacant seats 404C in the vehicle 104 at the third time instant "T+1" 402C, may be "four." At the third time instant "T+1" 402C, the vehicle-computing device 102 may transmit the information pertaining to the count of vacant seats 404C in the vehicle 104 to the application server 112. Based on the received information, the application server 112 may determine that when the vehicle 104 reaches the third station 108C, there will be "four" vacant seats in the vehicle 104. Therefore, the count of vacant seats (i.e., "two") that was predicted at the second time instant "T" 402B for the third station 108C is different from the actual count of vacant seats 404C (i.e., "four") at the third time instant "T+1" 402C. Thus, the application server 112 may update the valuation parameter 414B (i.e., "USD 4") to a valuation parameter 414C (i.e., "USD 3" with reference to Table 2).

The application server 112 may further transmit the valuation parameter 414C to each of the third plurality of mobile computing devices 408C associated with the third plurality of commuters 406C waiting for the vehicle 104 at the third station 108C. The transmission of the valuation parameters (such as the valuation parameter 412B and the valuation parameter 414B) is prior to the arrival of the vehicle 104 at the corresponding subsequent station.

A person having ordinary skill in the art will understand that the abovementioned exemplary scenarios are for illustrative purposes and should not be construed to limit the scope of the disclosure. Further, the scope of the disclosure is not limited to boarding of the vehicle 104 by all the commuters waiting at a station, such as the first station 108A, the second station 108B, or the third station 108C, for the vehicle 104. In an embodiment, one or more commuters from a plurality of commuters, such as the first plurality of commuters 406A, the second plurality of commuters 406B, or the third plurality of commuters 406C, waiting for the vehicle 104 may not board the vehicle 104. The one or more commuters may wait for another vehicle (not shown) that may arrive at the corresponding station after the vehicle 104. Further, the scope of the disclosure is not limited to the transmission of the valuation parameters to the plurality of mobile computing devices. In another embodiment, the application server 112 may transmit the determined valuation parameter for the one or more vacant seats corresponding to each of the one or more subsequent stations to a display device (not shown) installed at the corresponding one or more subsequent stations. Examples of the display device may include, but are not limited to, a Liquid Crystal Display (LCD) display, a Light Emitting Diode (LED) display, a plasma display, and/or an Organic LED (OLED) display technology.

Figure 5:
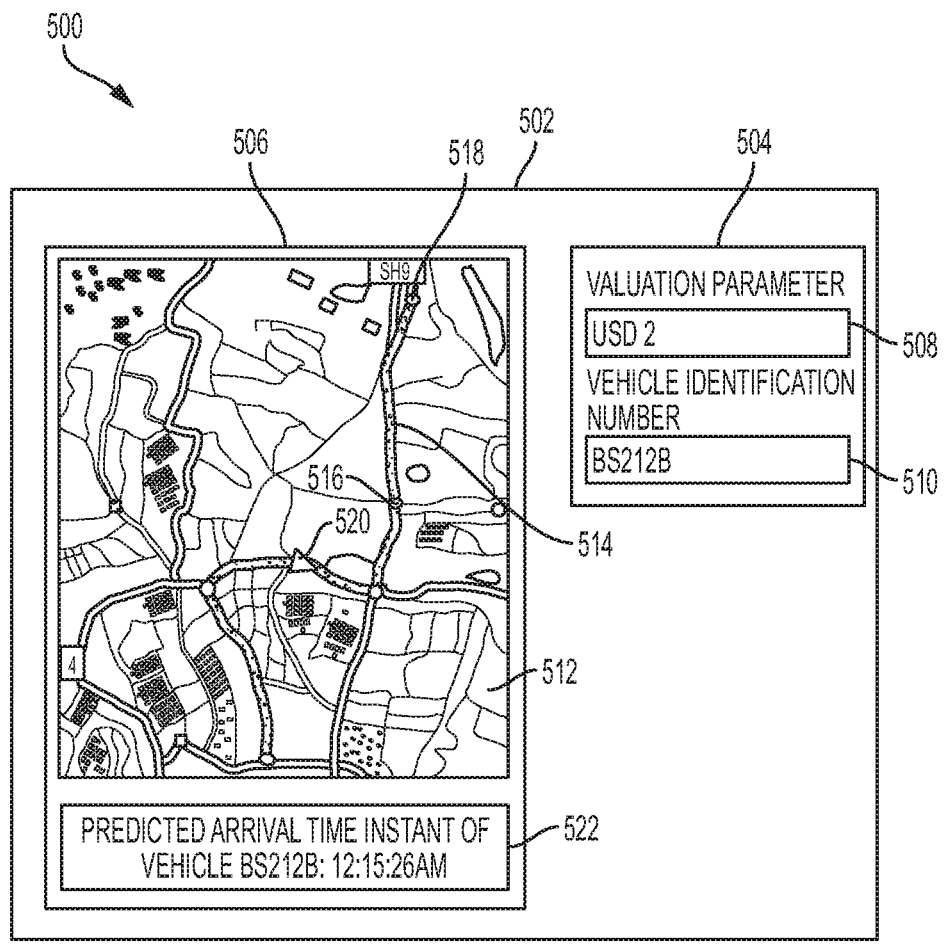
FIG. 5 illustrates an exemplary graphical user-interface (GUI) presented on a mobile computing device of a commuter to facilitate real time transportation service management, in accordance with at least one embodiment.

FIG. 5 illustrates an exemplary graphical user-interface (GUI) presented on a mobile computing device of a commuter to facilitate real time transportation service management, in accordance with at least one embodiment. FIG. 5 is described in conjunction with FIGS. 1-4C.

With reference to FIG. 5, there is shown a snapshot 500 that illustrates an exemplary GUI 502 presented on a display screen of a mobile computing device in a plurality of mobile computing devices (such as the first plurality of mobile computing devices 114A or the second plurality of mobile computing devices 104B associated with a commuter. The GUI 502 presents a first section 504 and a second section 506. The first section 504 comprises a first display box 508 that presents a "VALUATION PARAMETER," such as "USD 2," corresponding to the station, such as the first station 108A, the second station 108B, or the third station 108C, at which the commuter may be waiting for a vehicle, such as the vehicle 104. The first section 504 further comprises a second display box 510 that presents "VEHICLE IDENTIFICATION NUMBER," such as "BS212B," of the vehicle 104 that is next to arrive at the station at which the commuter may be waiting for the vehicle 104. The information presented in the first display box 508 and the second display box 510 may be updated by the application server 112. For instance, the application server 112 may update the valuation parameter for the vehicle 104 corresponding to the station at which the commuter may be waiting for the vehicle 104. In such a case, the first display box 508 may display the updated "VALUATION PARAMETER." At another instance, the commuter may choose to wait for another vehicle instead of boarding the vehicle 104 with "VEHICLE IDENTIFICATION NUMBER," such as "BS212B." In such a case, the second display box 510 may display the "VEHICLE IDENTIFICATION NUMBER" of another vehicle that is scheduled to arrive after the vehicle 104 with "VEHICLE IDENTIFICATION NUMBER," such as "BS212B."

The second section 506 presents a navigational map 512 comprising a route 514 of transit of a vehicle, such as the vehicle 104, which is to arrive at the station at which the commuter is waiting for the vehicle 104. The route 514 displays one or more stations, such as a station 516 and another station 518, which are subsequent to a current location 520 of the vehicle 104. A predicted arrival time of the vehicle 104, such as "PREDICTED ARRIVAL TIME INSTANT OF VEHICLE BS212B: 12:15:26 a.m.," may be also displayed to the commuter as a graphical and/or textual indication in portion 522 of the GUI 502.

A person having ordinary skill in the art will understand that the abovementioned exemplary GUI is for illustrative purpose and should not be construed to limit the scope of the disclosure.

The disclosed embodiments encompass numerous advantages. The disclosure provides a method and a system for data processing to manage transportation services in real time. The disclosed method utilizes historical demand data associated with a vehicle to determine demand distribution information of the vehicle. The demand distribution information comprises details pertaining to an association of a count of commuters with a valuation parameter. Thus, the disclosed method exploits the relationship between the demand for the vehicle and the valuation parameters to identify a set of rules that maximizes a key performance parameter of the vehicle. The disclosed method uses a Markov Decision Process (MDP) to generate the set of rules. The disclosed method provides real-time dynamic pricing information (i.e., determined/updated valuation parameters) based on a real-time demand for the vehicle at a plurality of stations. Further, the real-time pricing information is displayed in real-time on a spatial location, such as the plurality of stations, and is portable to mobiles and other Personal Digital Assistant (PDA) devices associated with commuters even before the arrival of the vehicle at the spatial location. Further, the disclosed method dynamically adapts the pricing information to a changing demand at the plurality of stations. Thus, the disclosed method enables the plurality of commuters waiting at the plurality of stations to take a timely decision, whether to board the vehicle or not. The disclosed method further provides a means to balance a load of the commuters traveling in the vehicle, in turn improving the efficiency of the transit network and enhances the traveling experience of the commuters.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for real time management of transportation services have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for data processing, by a computing device, to manage transportation services in real time, the method comprising:
    receiving, by one or more processors, historical demand data from one or more data acquisition devices installed at each of a plurality of stations along a route, over a communication network;
    receiving, by the one or more processors, information pertaining to a real time location of a vehicle, from a vehicle-computing device;
    determining, by the one or more processors in the computing device, a discrete control process with respect to a plurality of states of the vehicle received from a plurality of sensors, wherein each state in the plurality of states corresponds to a station and a count of vacant seats in the vehicle at the station, wherein the vehicle is in transit along the route, and wherein the plurality of stations includes the station;
    generating, by the one or more processors, a set of rules to maximize a key performance parameter of the vehicle, based on the determined discrete control process and demand distribution information received from a data acquisition device over the communication network;
    determining, by the one or more processors, a valuation parameter from a plurality of valuation parameters, in real time, for one or more vacant seats in the vehicle at each of one or more subsequent stations in the plurality of stations based on the generated set of rules, wherein the determined valuation parameter transitions the vehicle from a first state to a second state in the plurality of states, wherein the first state and the second state are associated with a first station and a second station, respectively, in the plurality of stations;
    determining, by the one or more processors, a likelihood of the transition of the vehicle from the first state to the second state as a function of count of commuters alighting the vehicle at the second station and a count of commuters boarding the vehicle at the second station, wherein the count of commuters alighting the vehicle and the count of commuters boarding the vehicle is determined based on the demand distribution information;
    transmitting, by one or more transceivers, the determined valuation parameter for the one or more vacant seats corresponding to each of the one or more subsequent stations to a plurality of mobile computing devices, over the communication network, associated with a plurality of commuters waiting for the vehicle at the corresponding one or more subsequent stations;
    generating an interactive graphical user interface (GUI) on a display screen of each mobile computing device associated with the plurality of commuters, wherein the GUI displays at least the determined valuation parameter, an identification number for the vehicle, a predicted arrival time for the vehicle, and a navigational map showing a current location of the vehicle; and
    selecting, by one of the plurality of commuters, a next vehicle scheduled to arrive after the vehicle currently displayed, based on at least the valuation parameter, wherein the GUI updates, in real time, information on the display screen to correspond with the next vehicle, wherein the set of rules is further generated based, in part, on the likelihood of the state transition for the vehicle.

2. The method of claim 1, wherein the demand distribution information is determined based on historical demand data for the vehicle at the plurality of stations along the route.

3. The method of claim 1, further comprising providing, by the one or more processors, the plurality of valuation parameters as an input to the discrete control process for the generation of the set of rules.

4. The method of claim 1, wherein the count of commuters boarding the vehicle at the second station is further determined based on the valuation parameter that transitioned the vehicle from the first state to the second state.

5. The method of claim 1, wherein the one or more subsequent stations are subsequent to a current location of the vehicle, while the vehicle is in transit along the route, wherein the valuation parameter corresponding to each of the one or more subsequent stations is determined prior to an arrival of the vehicle at any of the one or more subsequent stations.

6. The method of claim 1, wherein the plurality of sensors is installed in the vehicle.

7. The method of claim 1, wherein the determined valuation parameter is same for each vacant seat at a subsequent station in the one or more subsequent stations.

8. The method of claim 1, wherein the generated set of rules comprises an association between each of the plurality of valuation parameters and a count of the one or more vacant seats at each of the plurality of stations.

9. The method of claim 1, wherein the key performance index corresponds to at least one of: revenue generated by the vehicle and a load of commuters carried by the vehicle.

10. A system for data processing, by a computing device, to manage transportation services in real time, the system comprises:
    one or more data acquisition devices installed at each of a plurality of stations along a route, and configured to generate historical demand data;
    a vehicle-computing device configured to determine information pertaining to a real time location of a vehicle;
    one or more processors in the computing device configured to:
    determine a discrete control process with respect to a plurality of states of the vehicle received from a plurality of sensors, wherein each state in the plurality of states corresponds to a station and a count of vacant seats in the vehicle at the station, wherein the vehicle is in transit along the route, and wherein the plurality of stations includes the station;
    generate a set of rules to maximize a key performance parameter of the vehicle, based on the determined discrete control process and demand distribution information received from a data acquisition device over a communication network;
    determine a valuation parameter from a plurality of valuation parameters, in real time, for one or more vacant seats in the vehicle at each of one or more subsequent stations in the plurality of stations based on the generated set of rules, wherein the determined valuation parameter transitions the vehicle from a first state to a second state in the plurality of states, wherein the first state and the second state are associated with a first station and a second station, respectively, in the plurality of stations;

determine a likelihood of the transition of the vehicle from the first state to the second state as a function of count of commuters alighting the vehicle at the second station and a count of commuters boarding the vehicle at the second station, wherein the count of commuters alighting the vehicle and the count of commuters boarding the vehicle is determined based on the demand distribution information;

transmit the determined valuation parameter for the one or more vacant seats corresponding to each of the one or more subsequent stations to a plurality of mobile computing devices, over the communication network, associated with a plurality of commuters waiting for the vehicle at the corresponding one or more subsequent stations;

generate an interactive graphical user interface (GUI) on a display screen of each mobile computing device associated with the plurality of commuters, wherein the GUI displays at least the determined valuation parameter, an identification number for the vehicle, a predicted arrival time for the vehicle, and a navigational map showing a current location of the vehicle; and facilitate selection, by one of the plurality of commuters, a next vehicle scheduled to arrive after the vehicle currently displayed, based on at least the valuation parameter, wherein the GUI updates, in real time, information on the display screen to correspond with the next vehicle, wherein the set of rules is further generated based, in part, on the likelihood of the state transition for the vehicle.

11. The system of claim 10, wherein the demand distribution information is determined based on historical demand data for the vehicle at the plurality of stations along the route.

12. The system of claim 10, wherein the one or more processors are further configured to provide the plurality of valuation parameters as an input to the discrete control process for the generation of the set of rules.

13. The system of claim 10, wherein the count of commuters boarding the vehicle at the second station is further determined based on the valuation parameter that transitioned the vehicle from the first state to the second state.

14. The system of claim 10, wherein the valuation parameter corresponding to each of the one or more subsequent stations is determined prior to an arrival of the vehicle at any of the one or more subsequent stations.

15. The system of claim 10, wherein the generated set of rules comprises an association between each of the plurality of valuation parameters and a count of the one or more vacant seats at each of the plurality of stations.

16. A computer program product for use with a computer, the computer program product comprising a non-transitory computer readable medium, wherein the non-transitory computer readable medium stores a computer program code for data processing to manage transportation services in real time, wherein the computer program code is executable by one or more processors in a computing device to:

receive historical demand data from one or more data acquisition devices installed at each of a plurality of stations along a route, over a communication network;

receive information pertaining to a real time location of a vehicle, from a vehicle-computing device;

determine a discrete control process with respect to a plurality of states of the vehicle received from a plurality of sensors, wherein each state in the plurality of states corresponds to a station and a count of vacant seats in the vehicle at the station, wherein the vehicle is in transit along the route, and wherein the plurality of stations includes the station;

generate a set of rules to maximize a key performance parameter of the vehicle, based on the determined discrete control process and demand distribution information received from a data acquisition device over the communication network;

determine a valuation parameter from a plurality of valuation parameters, in real time, for one or more vacant seats in the vehicle at each of one or more subsequent stations in the plurality of stations based on the generated set of rules, wherein the determined valuation parameter transitions the vehicle from a first state to a second state in the plurality of states, wherein the first state and the second state are associated with a first station and a second station, respectively, in the plurality of stations;

determine a likelihood of the transition of the vehicle from the first state to the second state as a function of count of commuters alighting the vehicle at the second station and a count of commuters boarding the vehicle at the second station, wherein the count of commuters alighting the vehicle and the count of commuters boarding the vehicle is determined based on the demand distribution information;

transmit the determined valuation parameter for the one or more vacant seats corresponding to each of the one or more subsequent stations to the second state to a plurality of mobile computing devices, over the communication network, associated with a plurality of commuters waiting for the vehicle at the corresponding one or more subsequent stations;

generate an interactive graphical user interface (GUI) on a display screen of each mobile computing device associated with the plurality of commuters, wherein the GUI displays at least the determined valuation parameter, an identification number for the vehicle, a predicted arrival time for the vehicle, and a navigational map showing a current location of the vehicle; and facilitate selection, by one of the plurality of commuters, a next vehicle scheduled to arrive after the vehicle currently displayed, based on at least the valuation parameter, wherein the GUI updates, in real time, information on the display screen to correspond with the next vehicle, wherein the set of rules is further generated based, in part, on the likelihood of the state transition for the vehicle.

* * * * *